(12) United States Patent
Alam

(10) Patent No.: US 10,021,665 B1
(45) Date of Patent: Jul. 10, 2018

(54) PROCESSING REQUESTS IN COMMUNICATION SESSION

(71) Applicant: T-Mobile USA, Inc., Bellevue, WA (US)

(72) Inventor: Mohammad Shaheed Alam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/384,635

(22) Filed: Dec. 20, 2016

(51) Int. Cl.
| | |
|---|---|
| *H04W 60/00* | (2009.01) |
| *H04W 12/08* | (2009.01) |
| *H04L 29/08* | (2006.01) |
| *H04L 29/06* | (2006.01) |
| *H04W 88/02* | (2009.01) |

(52) U.S. Cl.
CPC ......... *H04W 60/00* (2013.01); *H04L 65/1006* (2013.01); *H04L 67/20* (2013.01); *H04W 12/08* (2013.01); *H04W 88/02* (2013.01)

(58) Field of Classification Search
CPC .... H04L 65/1006; H04L 67/20; H04W 12/08; H04W 60/00
See application file for complete search history.

(56) References Cited

U.S. PATENT DOCUMENTS

| | | | |
|---|---|---|---|
| 2004/0199641 A1 | 10/2004 | Bajko | |
| 2007/0011342 A1 | 1/2007 | Rosenberg | |
| 2009/0111427 A1* | 4/2009 | Mack | H04W 60/00 455/411 |
| 2009/0190577 A1 | 7/2009 | Allen et al. | |
| 2009/0225746 A1 | 9/2009 | Jackson et al. | |
| 2009/0247348 A1 | 10/2009 | Haupt et al. | |

(Continued)

FOREIGN PATENT DOCUMENTS

| | | |
|---|---|---|
| CN | 101056304 | 10/2007 |
| WO | WO2009097352 | 8/2009 |
| WO | WO2016022486 A1 | 2/2016 |

OTHER PUBLICATIONS

"802.11 Association Process Explained", Cisco, Meraki, retrieved Jan. 27, 2017 from <<https://documentation.meraki.com/MR/WiFi_Basics_and_Best_Practices/802.11_Association_process_explained >>, 2 pages.

(Continued)

*Primary Examiner* — Nizar Sivji
(74) *Attorney, Agent, or Firm* — Lee & Hayes, PLLC

(57) ABSTRACT

A core telecommunications-network device can receive a request associated with user equipment (UE) and transmit a third-party request on behalf of the UE to a mandatory network device. The core device can receive a first reply from the mandatory network device indicating success or failure of the third-party registration request, determine a second reply based on the first reply, and transmit the second reply to the UE via the telecommunications network. The core device can process the request and transmit the third-party request if successful. The UE can receive the second reply including status. In response to one status, the UE can retry the registration request via a first access network. In response to another status, the UE can delay for a predetermined time period, and refrain, during the delay, from retrying the registration request via the first access network.

20 Claims, 10 Drawing Sheets

(56) References Cited

U.S. PATENT DOCUMENTS

| | | | |
|---|---|---|---|
| 2010/0216430 | A1 | 8/2010 | Brown et al. |
| 2014/0289348 | A1 | 9/2014 | Allen et al. |
| 2015/0088987 | A1 | 3/2015 | Cai et al. |
| 2015/0282108 | A1 | 10/2015 | Kiss |
| 2015/0350983 | A1 | 12/2015 | Kwok et al. |
| 2015/0381601 | A1 | 12/2015 | Toshniwal et al. |
| 2016/0105551 | A1 | 4/2016 | Rameil-Green |
| 2016/0278037 | A1 | 9/2016 | Kiss |
| 2017/0041768 | A1 | 2/2017 | Pattan et al. |
| 2017/0273046 | A1 | 9/2017 | Piscopo, Jr. |

OTHER PUBLICATIONS

"Cisco Secure Services Client Administrator Guide, Release 5.1", Oct. 19, 2013, retrieved Jan. 27, 2017 from <<http://www.cisco.com/c/en/us/td/docs/wireless/wlan_adapter/secure_client/5-1/administration/guide/SSC_Admin_Guide_5_1/C1_Network_Security.html>>, 15 pages.

Dukinfield, D., "Service Provider Wi-Fi Integration", Cisco, 2013-2014, retrieved from <<http://www.mobilitydg.org/wp-content/uploads/2015/01/02-SP-WiFi-Architectures-MDG-d2.pdf>>, 22 pages.

"ETSI TS 123 003 v 13.5.0", Apr. 2016, pp. 1, 24-27, and 71-73.

"ETSI TS 123 167 v 12.1.0", Mar. 2015, pp. 1, 3-4, 8-21, 24-26 and 39.

"ETSI TS 123 228 v 12.8.0", Mar. 2015, pp. 1, 26-32, 67-74, 82-83, 89-92, and 179-180.

"ETSI TS 123 271 v 12.1.0", Oct. 2014, pp. 1, 19-31, and 40.

"ETSI TS 124 229 v 13.5.1", May 2016, pp. 1, 76, 85-97, 200-221, 223-228, 280-285, 292, and 326-329.

"ETSI TS 136 413 v 13.4.0", Oct. 2016, pp. 1, 77-79, 124, and 148-151.

"J-STD-036-A Enhanced Wireless 9-1-1 Phase 2", Jun. 2002, pp. 1, 9-23, 27-32, and 37-39.

Jennings, C. Request for Comments 5626 , Standards Track, Oct. 2009, pp. 1-18, 21-22, and 49.

"LTE Location-Based Services Technology Introduction", retrieved Oct. 26, 2016 from <<http://rohde-schwarz-wireless.com/documents/LTELBSWhitePaper_RohdeSchwarz.pdf>>, 22 pages.

Niemi, "Session Initiation Protocol (SIP) Extension for Event State Publication," Networking Working Group, Request for Comments 3903, Oct. 2004, 32 pages.

Norell, L., et al., "Wi-Fi Calling—Extending the Reach of VoLTE to Wi-Fi", Ericsson Review, retrieved Oct. 10, 2016 from <<http://www.ericsson.com/res/thecompany/docs/publications/ericsson_review/2015/er-wifi-calling.pdf>>, 8 pages.

"Real Time Communication—Third Party Registration", Nov. 17, 2014, retrieved Oct. 25, 2016 from <<https://realtimecommunication.wordpress.com/2014/11/17/third-party-registration/>>, 9 pages.

Roach, "SIP—Specific Event Notification", Internet Engineering Task Force (IETF), Request for Comments 6665, Jul. 2012, pp. 1-29.

Rosenberg et al., "A Session Initiation Protocol (SIP) Event Package for Conference State", Network Working Group, Request for Comments 4575, Aug. 2006, 48 pages.

Rosenberg et al., "An INVITE-Initiated Dialog Event Package for the Session Initiation Protocol (SIP)," Network Working Group, Request for Comments 4235, Nov. 2005, 39 pages.

Rosenberg, J., "Request for Comments 3680", Standards Track, Mar. 2004, 26 pages.

Rosenberg et al., "SIP: Session Initiation Protocol", Network Working Group, Request for Comments 3261, The Internet Society, Jun. 2002, pp. 1-8 and 57-66.

Spirent.com, "IMS Procedures and Protocols", available at <<http://www.spirent.com/~/media/White%20Papers/Mobile/Protocol_Reference_Guide.pdf>>, 31 pages.

Office action for U.S. Appl. No. 15/072,653, dated Mar. 20, 2017, Piscopo, "Communication Session Registration—and Subsidiary Request Processing", 11 pages.

PCT Search Report and Written Opinion dated May 24, 2017 for PCT application No. PCT/US2017/022026, 12 pages.

Office action for U.S. Appl. No. 15/072,653, dated Sep. 6, 2017, Piscopo, "Communication Session Registration—and Subsidiary Request Processing", 14 pages.

Office action for U.S. Appl. No. 15/072,653, dated Jan. 25, 2018, Piscopo, "Communication Session Registration—and Subsidiary Request Processing", 10 pages.

PCT Search Report and Written Opinion dated Mar. 29, 2018, for PCT Application No. PCT/US17/66037, 11 pages.

* cited by examiner

US 10,021,665 B1

PROCESSING REQUESTS IN COMMUNICATION SESSION

BACKGROUND

A computing device configured for telecommunications, such as a wireless smartphone, is generally capable of providing a user various communications services. However, some services have service-specific requirements, which may not be supported by all computing devices. This can restrict a user's ability to access particular services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
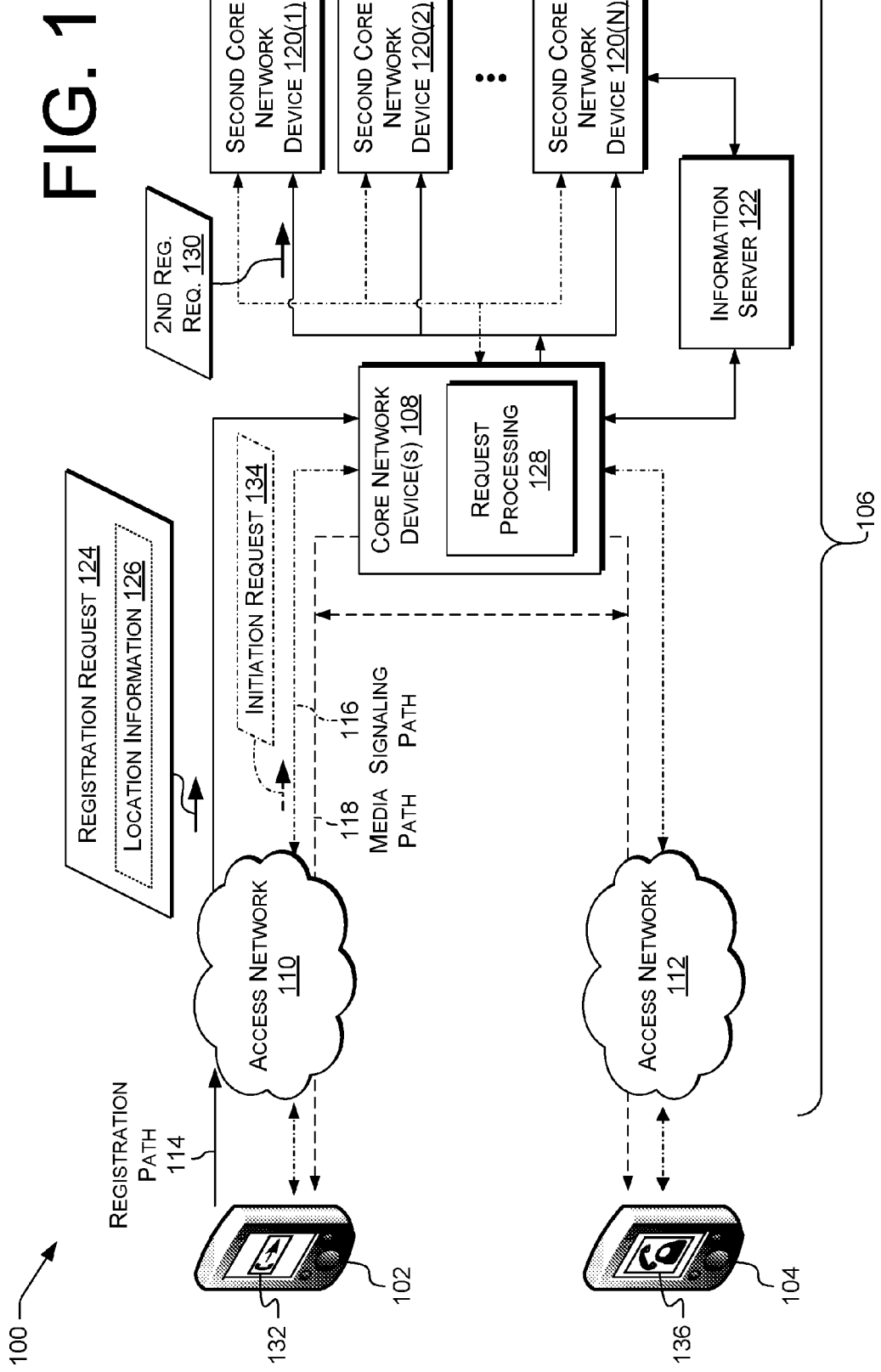
FIG. 1 is a block diagram illustrating a telecommunication system in accordance with some examples of the present disclosure.

Systems and techniques described herein permit computing devices to more rapidly and efficiently establish communication via telecommunications networks. The term "session" as used herein includes a communications path via at least one telecommunications network for exchange of data among two or more computing devices. Example sessions include voice and video calls, e.g., by which human beings converse, a data communication session, e.g., between two electronic systems or between an electronic system and a human being, or a Rich Communication Services (RCS, also known as JOYN) session. In many networks, these and other types of sessions are facilitated by respective, different core network devices, e.g., Application Servers (ASes). Systems and techniques herein improve robustness and efficiency of registration by devices for network services provided by multiple such core network devices compared to prior schemes.

Many Long Term Evolution (LTE) cellular networks support voice over LTE (VoLTE). VoLTE systems support communications between handsets and one or more ASes. As a prerequisite to receiving service from a particular AS, a VoLTE handset or other terminal registers with that AS. The VoLTE handset sends a Session Initiation Protocol (SIP) REGISTER message to a serving call session control function (S-CSCF). The S-CSCF transmits SIP REGISTER messages to individual ASes on behalf of the handset. After an AS processes the REGISTER for a handset, that handset can receive service from that AS. Often, handsets also send SIP SUBSCRIBE messages to at least one AS (or the S-CSCF sends SIP SUBSCRIBE messages to at least one AS on behalf of the handset) to receive notification of relevant events, e.g., for presence detection or network-state changes. However, race conditions between REGISTER and SUBSCRIBE messages can result in failures of the SUBSCRIBE, forcing, e.g., a user of a smartphone to wait extra time before receiving service. Moreover, failures of the REGISTER may not be effectively reported to the UE, triggering the UE to retry registration even when the retry is unlikely to be successful. Such retries can consume UE battery life and network bandwidth without benefit.

In some examples, the S-CSCF does not respond to a REGISTER until a third-party REGISTER by the S-CSCF to a Telephony Application Server (TAS) or other AS has succeeded. This permits rapidly registering to multiple ASes without risking the above-noted race conditions. This also saves bandwidth and eliminates a possible race condition between REGISTER and SUBSCRIBE. Moreover, this permits the S-CSCF to accurately inform the UE of the cause of a registration failure, so that the UE can avoid retrying if the retry is unlikely to succeed.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as LTE carrying VoLTE sessions using SIP signaling, the PSTN using Signaling System 7 (SS7) signaling, and data networks, such as Institute of Electrical and Electronics Engineers (IEEE) 802.11 ("WIFI") networks carrying voice over Internet Protocol (VoIP) calls or other over-the-top (OTT) sessions encapsulating, e.g., voice or video data in a way transparent to an underlying packet transport. Other example networks carrying sessions can include Internet Protocol (IP) Multimedia Subsystem (IMS)-based networks, which can have various types of access networks, e.g., LTE or WIFI access networks. Techniques described herein can be used with these and other types of networks having staged setup processes or protocols in which a core network device must successfully process a first setup or sign-in message, e.g., a SIP REGISTER, before processing of a second setup or sign-in message, e.g., a SIP SUBSCRIBE or PUBLISH message, can succeed.

In some examples, a core network device is communicatively connectable with cellular user equipment (UE) or another computing device or terminal. For example, the core network device can include an S-CSCF. The UE can be configured to generate a registration request, and to transmit the registration request, e.g., to the core network device. The core network device can receive the registration request and transmit an indication of the request on behalf of the UE, e.g., to an AS, via the telecommunications network. This indication can include a third-party request. The core network device can reply to the UE only after third-party request(s) to mandatory network device(s) have succeeded. In the event of a third-party registration failure, the core network device can provide the UE information that the failure was in third-party registration. In some examples, the UE can determine the number of timing of retries, or other action in response to a registration failure, based on the received information.

Various examples herein reduce the core and access-network bandwidth consumed by unsuccessful staged-setup attempts. Various examples reduce the probability of network overload due to setup retries that cannot succeed. Various examples herein reduce power consumption at the UE by reducing the amount of setup data transmitted, and thereby extend battery life of the UE. Various examples herein reduce the probability of race conditions between the two phases of a staged setup process, increasing network robustness and stability.

Illustrative Examples

FIG. 1 is a block diagram illustrating a telecommunication system 100 according to some examples of the present disclosure. The system includes computing devices 102 and 104, e.g., user equipment or other mobile phones or communications devices or terminals, communicatively connectable with a telecommunications network 106. The computing devices 102 and 104 can be operated, e.g., by a first user and a second user respectively (not shown). The computing devices 102 and 104 are communicatively connected to one or more core network device(s) 108, e.g., via respective access networks 110 and 112. Access networks 110 and 112 can include, e.g., LTE access networks, WIFI networks, or access networks of other types described herein. The core network device(s) 108 can include, e.g., an S-CSCF of an IMS in a VoLTE-capable network, or one or more ASes, such as a TAS. For brevity, other components of telecommunications network 106 are omitted. For example, a proxy call session control function (P-CSCF) can relay communications from computing device 102 between access network 110 and core network device 108, e.g., an S-CSCF.

The computing devices 102 and 104 can be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the computing devices 102 and 104 as being "mobile" or "wireless," (e.g., configured to be carried and moved around), it is to be appreciated that the computing devices 102 and 104 can represent various types of communication devices that are generally stationary as well, such as televisions, desktop computers, game consoles, set top boxes, and the like. In this sense, the terms "communication device," "wireless device," "wireline device," "mobile device," "computing device," "user equipment (UE)," and "terminal" may be used interchangeably herein to describe any communication or computing device capable of performing techniques described herein with respect to, e.g., computing devices 102 and 104. For example, some computing devices can be capable of communicating via multiple access networks, and can register via one or more of those networks at any particular time.

Computing devices 102 and 104 can communicate at least three types of information: registration information, signaling information, and media information. Registration information is carried via registration path 114, depicted using solid lines. Signaling information is carried via signaling path 116, depicted using dash-dotted lines. Media information is carried via media path 118, depicted using dashed lines. For brevity, registration path 114 is shown only for computing device 102. Computing device 104 can additionally or alternatively conduct registration signaling via a corresponding registration path. The illustrated paths can represent different packet flows along a common network, along different networks, or any combination thereof.

Registration information can include information useful for establishing that a computing device 102 or 104 is eligible to receive service, e.g., SIP REGISTER or SUBSCRIBE requests, or 802.1X, RADIUS, or Diameter authentication-protocol messages. Signaling information can include information relating to call setup and teardown, e.g., SIP INVITE or BYE requests, or SIP 100 Trying, 180 Ringing, or 200 OK responses. Media information can include audio, video, or other user-specified or -accessible data of a communication session, e.g., carried via the Real-time Transport Protocol (RTP) and encoded using a selected codec. Nonlimiting example codecs can include an adaptive multi-rate (AMR) or International Telecommunications Union (ITU) G.711 audio codec, or an ITU H.263 or Moving Picture Experts Group (MPEG) MPEG-4 video or audiovisual codec.

In some examples, core network device 108 is communicatively connected with one or more second core network device(s) 120(1)-120(N) (individually and/or collectively referred to herein with reference 120), for integer N>1, e.g., ASes. Second core network devices 120 can receive registration information via core network device 108. Second core network devices 120 can additionally or alternatively receive signaling information via core network device 108. In some examples, second core network devices 120 can serve as anchoring network devices, which proxy signaling traffic for communication session(s). For example, a second core network device 120 can operate as a SIP proxy or back-to-back user agent (B2BUA). In some examples, a second core network device 120 (or other anchoring network device, and likewise throughout) can provide session-control services to computing devices 102 or 104. In some examples, core network device 108 or a second core network device 120 can be configured to communicate with an information server 122. Information server 122 can be or include an authorization or authentication server, e.g., a home location register (HLR)/home subscriber server (HSS). Information server 122 can additionally or alternatively be or include a Location Retrieval Function (LRF), Location Server (LS), or other server providing data of a position of, or providing location information associated with, a computing device 102 or 104. Core network devices 108 or 120 can communicate with information server 122, e.g., via the SIP or Diameter protocols or other protocols, e.g., over the LTE Sh interface or other appropriate interfaces.

When computing device 102 powers up or connects to the telecommunications network, computing device 102 can transmit a registration request 124, e.g., via registration path 114. For example, registration request 124 can include a SIP REGISTER request. As used herein, the term "request" signifies a message transmission to which a response is expected for normal functioning of network service(s) associated with the request. For example, computing device 102 can transmit a SIP REGISTER request and then expect a SIP 401 Unauthorized or SIP 200 OK response indicating the status of an attempted registration included in the REGISTER request.

As used herein, a message "transmitted to" or "transmitted toward" a destination, or similar terms, can be transmitted directly to the destination, or can be transmitted via one or more intermediate network devices to the destination. In the illustrated example, computing device 102 transmits registration request 124 to core network device 108 via access network 110. Similarly, a message "received from" a destination can be received directly from the destination, or can be received via one or more intermediate network devices from the destination. In the illustrated example, core network device 108 receives registration request 124 from computing device 102 via access network 110. A message passing through one or more intermediate network devices can be modified by those network devices, e.g., by adding or removing framing, or by changing a presentation of at least part of the message, e.g., from a SIP start-line to a SIP header or vice versa.

Registration request 124 can include, e.g., registration information associated with computing device 102. Registration information can include identification information or authorization information. Identification information can include, e.g., a terminal identifier such as an international mobile equipment identity (IMEI), a user identifier such as an international mobile subscriber identity (IMSI), a network identifier such as a mobile country code (MCC) and a mobile network code (MNC), a user address such as an ITU E.164 international-dialing-plan telephone number, mobile station international subscriber directory number (MSISDN), or network address, such as an Internet IPv4 or IPv6 address, or a country code, e.g., indicating a country in which computing device 102 is located. Authorization information can include, e.g., a username, password, password hash, challenge response, cryptographic ticket, or other information usable by an authorization function of information server 122, e.g., independently or in association with the identification information, to determine access to services of telecommunications network 106 that should be provided to computing device 102. Registration information can be included in, or determined based at least in part on, service information 224 in some examples.

The registration request 124 can, but may or may not in various examples, include location information 126. Location information 126 can include data corresponding to a physical location of the computing device 102, e.g., an address, a set of coordinates, or a cell-tower identifier or other logical identifier that can be correlated with geometry. Location information can additionally or alternatively include an MCC, MNC, country code, or other location information described herein.

In some examples, after registration request 124 succeeds, computing device 102 transmits at least one subsidiary request (omitted for brevity), e.g., via registration path 114. A subsidiary request can include a request contingent for its success on the success of registration request 124. For example, some network architectures require that a SIP REGISTER (an example primary request) be successfully processed, so that computing device 102 is authenticated to core network device 108, before a SIP SUBSCRIBE (an example subsidiary request) from computing device 102 can be successfully processed.

In some examples, a SIP SUBSCRIBE request causes second core network device 120 to notify computing device 102 when particular events occur, those events being defined within an "event package." In some examples, a SIP PUBLISH request conveys information about a state of computing device 102, e.g., with respect to events defined in an event package, to second core network device 120. A SIP PUBLISH, for example, can convey information about presence, handset capabilities, supported codecs, or handset location. Updated information can be conveyed to subscribed computing devices, e.g., via SIP NOTIFY requests to those devices.

Core network device 108, upon receiving registration request 124, can perform novel request processing 128, described below in more detail with reference to FIGS. 2 and 4-8. For example, in response to registration request 124 or successful completion of registration, core network device 108 can transmit third-party registration requests, e.g., to one or more second core network devices 120. In some examples, core network device 108 can determine, e.g., using stored initial filter criteria (iFCs), which second core network device(s) 120 should receive third-party registration requests. Core network device 108 can then fork registration request 124 or transmit third-party registration request(s) to at least some of those second core network device(s) 120. An example second registration request 130 is shown, which can represent a fork of registration request 124 or a third-party registration request in response to registration request 124.

In response to processing of registration request 124 or second registration request 130, core network device(s) 108 or 120 can transmit status responses. If processing of the request(s) 124, 130 succeeds, the relevant core network device(s) 108 or 120 can then transmit acknowledgements, e.g., a SIP 200 OK response. Core network device 108 can transmit acknowledgements to computing device 102 on its own behalf, or on behalf of second core network device(s) 120. For example, core network device 108 can fork the registration request 124 to one or more second core network device(s) 120, await acknowledgements from those second core network device(s) 120, and then transmit an acknowledgement to computing device 102 indicating success of the registration request 124 and the (forked) second registration request(s) 130. Functions described throughout this document in relation to acknowledgements can additionally or alternatively be performed for error messages or other responses, unless otherwise expressly noted.

In some examples, processing of registration request 124 by core network device 108 can succeed, but processing of second registration request 130 by at least one second core network device 120 can fail. In some examples, core network device 108 transmits a response to computing device 102, and the response represents the success or failure of processing of both registration request 124 and at least one second registration request 130 (e.g., of all second registration requests 130). Examples are discussed herein, e.g., with reference to FIGS. 2 and 4-10. In some examples, computing device 102 can then take corrective action, e.g., to correct defects in the registration request 124, and then retry the registration. This can permit computing device 102 to successfully complete the first stage of a staged setup, e.g., a SIP REGISTER, before attempting a second or subsequent stage, e.g., a SIP SUBSCRIBE.

As used herein, "retrying" refers to transmitting a second or subsequent request designed to produce substantially the same effect as a first, failed request with respect to specific core network device(s) or function(s), e.g., at the network, transport, application, or other layers. For example, retrying a first SIP REGISTER request can include transmitting a second SIP REGISTER request. The first and second SIP REGISTER requests can be identical, substantially identical, or different in at least one respect. For example, as discussed herein with reference to block 1004, FIG. 10, retrying a SIP REGISTER can include adding to the second SIP REGISTER request a header or other field indicating position information. In some examples described herein with reference to block 1012, FIG. 10, a first SIP REGISTER request via a WIFI access network can fail. The first REGISTER can be retried by transmitting a second, different SIP REGISTER request via an LTE access network. Both REGISTER requests can be designed to request access to application-layer services of a TAS or other AS, such as voice calling or text messaging.

Subsequent to the successful completion of a setup process (e.g., REGISTER and SUBSCRIBE), the first user may place a call to (i.e., establish a communication session with) the second user. The computing device 102, e.g., in response to actuation by the second user of a "Send" control 132, can transmit an initiation request 134 of a communication session, e.g., a SIP INVITE, via, e.g., signaling path 116. The computing device 102 in this example is a session-originating device, i.e., a computing device initiating a communication session with another computing device. Session-originating devices can include user equipment or other telecommunications or computing devices communicatively connectable with other computing devices via one or more core network device(s) 108. Mobile phones and copper-loop landline phones can be examples of session-originating devices.

The initiation request 134, e.g., representing an outgoing voice call, can include information of at least one destination, e.g., at least one computing device or other telecommunication device (e.g., computing device 104) with which computing device 102 is requesting a session be established. At least one second core network device 120, e.g., a TAS, can process the initiation request 134, e.g., according to or based at least in part on information in registration request 124 or a subsidiary request. At least one second core network device 120 can further, in response to the initiation request 134 or subsequent processing, transmit notification messages such as SIP NOTIFY messages. In an example, computing device 102 subscribes to the SIP "dialog" event package. When a SIP dialog anchored at second core network device 120(1) is established, second core network device 120(1) transmits a SIP NOTIFY message to computing device 102 indicating the establishment.

Call initiation can be performed, e.g., as defined in the Global System for Mobile (GSM) or voice-over-Long Term Evolution (VoLTE) standards, and can include the exchange of additional messages (not shown) between the computing devices 104 and 102 and the core network device(s) 108 or 120. For example, the user of computing device 104 can operate a call-acceptance control 136 such as a touchscreen button. Computing device 104 can then transmit a SIP 200 OK response to a SIP INVITE message. Once the session is established, data of the session, such as audio data or video data, can be exchanged between computing devices 104 and 102 via a communications channel depicted as media path 118. As shown, media path 118 can pass through core network device(s) 108 or 120 or can bypass core network device(s) 108 and 120.

Figure 2:
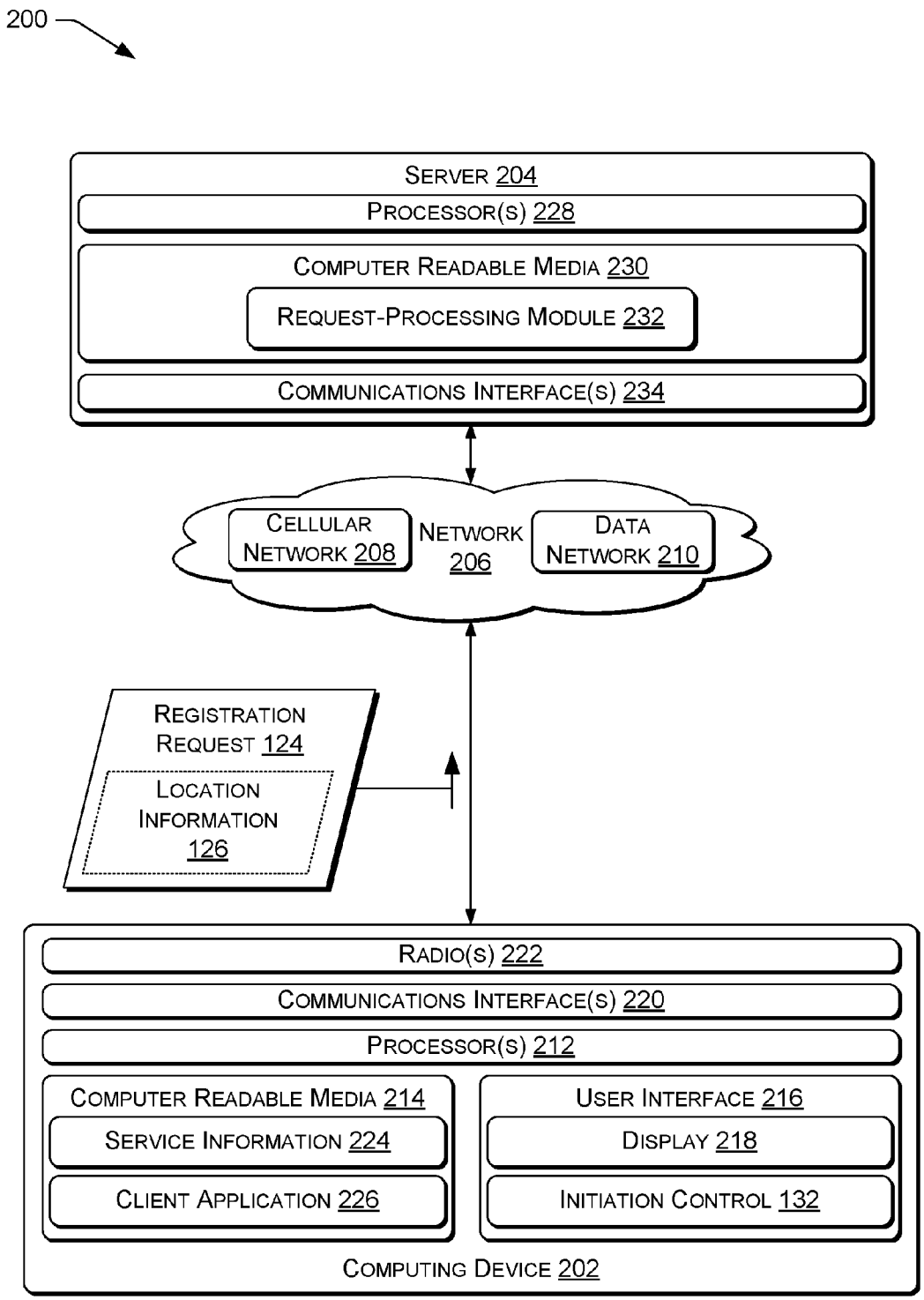
FIG. 2 is a block diagram illustrating components of a telecommunication system in accordance with some examples of the present disclosure.

FIG. 2 is a block diagram illustrating a system 200 permitting staged setup processing according to some examples of the present disclosure. The system 200 includes a computing device 202, e.g., a wireless phone or other user equipment, which can represent computing device 102 or 104, FIG. 1. Computing device 202 can be coupled to a server 204 via a telecommunications network 206, which can represent network 106, FIG. 1. The server 204 can be an example of the core network device(s) 108 or 120, FIG. 1, e.g., an S-CSCF, TAS, or other AS.

The network 206 can include one or more networks, such as a cellular network 208 and a data network 210. The network 206 can include one or more core network(s) connected to user equipment via one or more access network(s). Example access networks include LTE (e.g., the Evolved UMTS Terrestrial Radio Access Network or EUTRAN), WIFI, GSM EDGE Radio Access Network (GERAN), UMTS Terrestrial Radio Access Network (UTRAN), and other cellular access networks.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1* protocols such as 802.11 or 802.15, wireless microwave access (WIMAX), WIFI, and/or any future IP-based network technology or evolution of an existing IP-based network technology. Communications between the server 204 and computing devices such as the computing device 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 (BLUETOOTH), Asynchronous Transfer Mode (ATM), WIMAX, and other network technologies, e.g., configured to transport Internet Protocol (IP) packets. In some examples, the server 204 includes or is communicatively connected with an interworking function (IWF) or other device bridging networks, e.g., LTE, 3G, and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry data packets using High Speed Packet Access (HSPA), LTE, or other technologies as well as voice traffic. Some cellular networks 208 carry both data and voice in a packet-switched format. For example, many LTE networks carry voice traffic in data packets according to the voice-over-LTE (VoLTE) standard. Some LTE networks can interconnect with WIFI access networks to permit IMS-mediated voice-over-WIFI (Vo-WIFI) calling. Various examples herein provide origination and termination of, e.g., carrier-grade voice calls on, e.g., circuit-switched (CS) networks 206 or mixed VoLTE/3G networks 206, and on computing devices 202 including original equipment manufacturer (OEM) handsets, non-OEM handsets, or computing devices running over-the-top (OTT) SIP client software.

The computing device 202 can be or include a wireless phone, a wired phone, a tablet computer, a laptop computer, a wristwatch, or other type of computing device. The computing device 202 can include at least one processor 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 214, such as memory (e.g., random access memory (RAM), solid state drives (SSDs), or the like), disk drives (e.g., platter-based hard drives), another type of computer-readable media, or any combination thereof.

The computing device 202 can further include a user interface (UI) 216, e.g., including an electronic display device 218, a speaker, a vibration unit, a touchscreen, or other devices for presenting information to a user or receiving commands from the user. The user interface 216 can include a session-initiating user interface control 132, e.g., a touchscreen button, to indicate a communication session should be initiated. The user interface 216 or components thereof, e.g., the electronic display device 218, can be separate from the computing device 202 or integrated (e.g., as illustrated in FIG. 1) with the computing device 202.

The computing device 202 can further include one or more communications interface(s) 220 configured to selectively communicate via the network 206. For example, communications interface(s) 220 can operate one or more radio(s) 222 of computing device 202 to communicate via network 206. Radio(s) 222 can, e.g., communicate via access network(s) 110 or 112 of cellular network 208. Communications interface(s) 220 can additionally or alternatively include one or more transceivers or other components configured to communicate using wired connections via the network 206.

The computer readable media 214 can be used to store data and to store components that are operable by the processor 212 or instructions that are executable by the processor 212 to perform various functions as described herein. The computer readable media 214 can store various types of instructions and data, such as an operating system, device drivers, etc. Stored processor-executable instructions can be arranged in modules or components. Stored processor-executable instructions can be executed by the processor 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processor 212. Tangible computer-readable media can include volatile and nonvolatile, removable and non-removable media implemented in any method or technology for storage of information, such as computer readable instructions, data structures, program modules, or other data.

The computer readable media 214 can store service information 224 indicating information of the computing device 202, a user thereof, or at least one network service the computing device 202 is configured to use. The service information 224 can include, e.g., indications of application servers or service types to which the computing device 202 may attempt to connect. In some examples, the service information 224 can include position data, or other location information 126, of the computing device 202 or a user of or associated with the computing device 202.

The computer readable media 214 can include processor-executable instructions of a client application 226 or other modules or components. The client application 226, e.g., a native or other dialer, can permit a user to originate and terminate communication sessions associated with the computing device 202, e.g., a wireless phone. In some examples, the client application 226 can cause computing device 202 to transmit at least one of the registration request 124, a subsidiary request such as a SIP SUBSCRIBE, or the initiation request 134 to the server 204. The client application 226 can determine at least some of the contents of at least one of the registration request 124, the subsidiary request, or the initiation request 134 based at least in part on the service information 224. In some example, the processor-executable instructions of the client application 226 can be executed by the processor 212 to perform various functions described herein, e.g., with reference to at least one of FIGS. 9 and 10.

The server 204 can include at least one processor 228 and one or more computer readable media (CRM) 230. The computer readable media 230 can be used to store processor-executable instructions of a novel request-processing module 232 or other modules or components. The request-processing module 232 can represent or perform request processing 128, as shown in FIG. 1. The processor-executable instructions can be executed by the processor 228 to perform various functions described herein, e.g., with reference to at least one of FIGS. 4-8.

The server 204 can include one or more communications interface(s) 234, e.g., of any of the types described above with reference to communications interface(s) 220. For example, server 204 can communicate via communications interface(s) 234 with information server 122 or with other core network devices 108 or 120.

Various use cases for mobile communications involve a position of computing device 202, e.g., a UE. For example, emergency services such as "9-1-1" in the US and "1-1-2" in Europe can use the position of computing device 202 to route emergency calls to the appropriate Public Safety Answering Point (PSAP) or to direct first responders to the computing device 202. Search services can use the position of computing device 202 to limit the spatial range of results returned for queries such as "nearby restaurants" or "Mike Oldfield tour stops," e.g., to results within a predetermined distance of the computing device 202. Mapping services can show the position of computing device 202 on a map or provide turn-by-turn directions.

As used herein, the "position" of a computing device 202 is the physical position of the computing device 202, e.g., expressible using latitude and longitude. All positioning techniques have specific precision and accuracy, so the "position" of a device, as used herein, can refer to a spatial area within which the computing device 202 is determined to be present (e.g., 42° N, 42° E±15 m for Global Positioning System (GPS)-derived position). "Position data" or "position information" is a representation of position, e.g., in decimal or hour-minute-second degrees of a center or corners of a region in which the computing device 202 is determined to be present. Position data can additionally or alternatively include street addresses, building numbers, or other non-coordinate indications of a position of computing device 202.

As used herein, "location information" is any information used or useful in determining position of computing device 202. Location information, e.g., location information 126, can include position information. For example, computing device 202 can determine its position via GPS, and provide coordinates of the determined position as or in location information, e.g., included in a SIP REGISTER request. Additionally or alternatively, location information can include information that is not position information, but that can be used in determining or estimating position. For example, location information can include an EUTRAN Cell Global Identification (ECGI) of an eNodeB to which computing device 202 is, or has recently been, connected. Since an eNodeB has a limited spatial range, an ECGI indicates an area (eNodeB coverage area) in which the computing device 202 is (or recently was) positioned.

Figure 3:
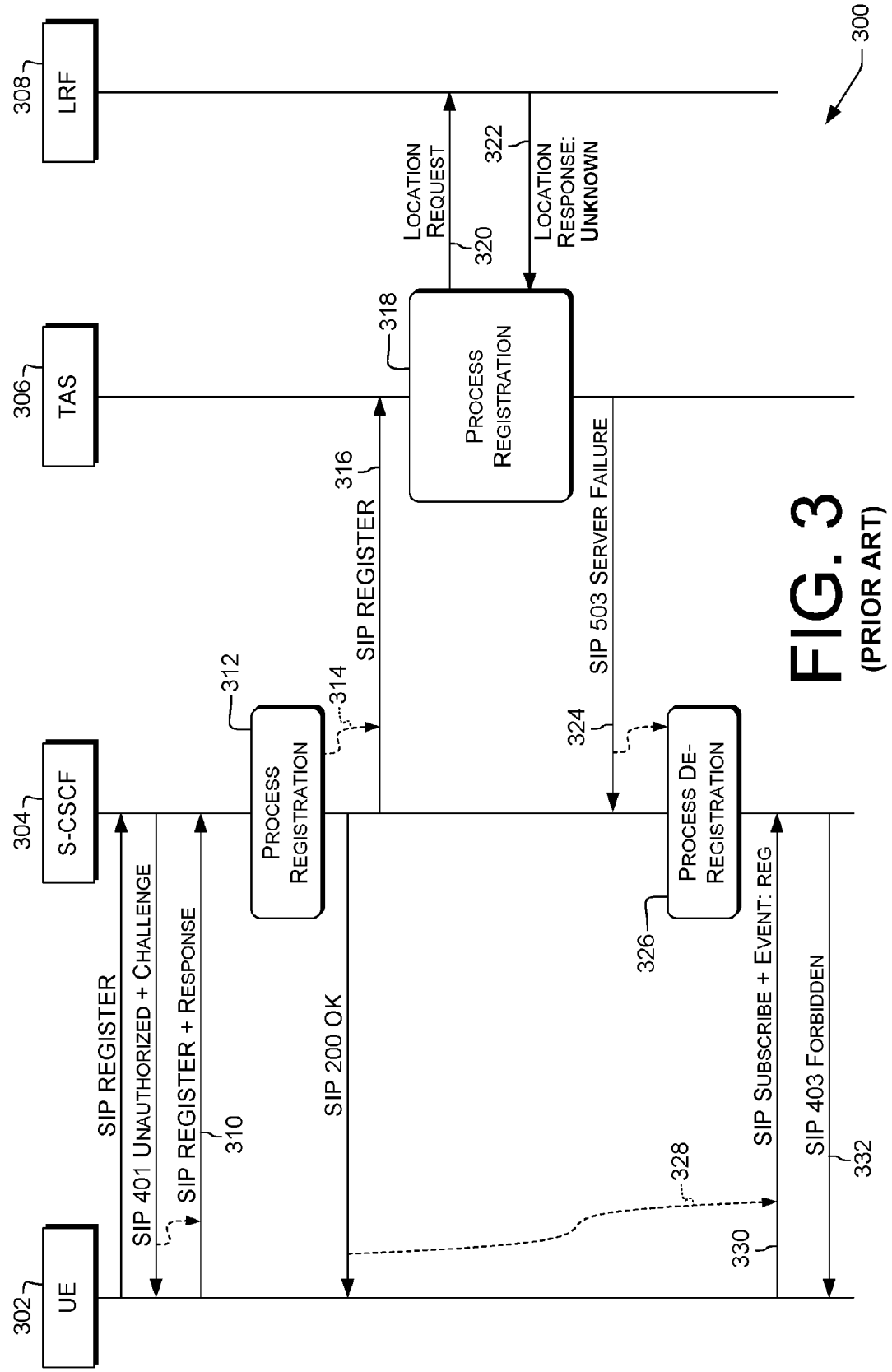
FIG. 3 shows a call flow illustrating an example of a conventional registration process.

FIG. 3 shows a conventional call flow 300 illustrating an example of failure of a registration process, e.g., from a UE 302, e.g., a VoLTE or VoWIFI UE, to an IMS-based telecommunications network, as is known in the prior art. UE 302, in this example, is registering to an S-CSCF 304 and a telephony application server (TAS) 306. TAS 306 communicates with a LRF 308. Other core network devices, e.g., a P-CSCF may be present, but are omitted for brevity.

As shown, UE 302 sends a registration request in the form of a SIP REGISTER message. In this example, S-CSCF 304 responds to the REGISTER message with a SIP 401 Unauthorized error and a challenge, e.g., a nonce. In response, as indicated by the dashed arrow, computing device 102 transmits a second SIP REGISTER message 310 including a response to the challenge, e.g., a hash of the nonce and a shared secret.

At block 312, S-CSCF 304 processes the registration. Block 312 can include verifying the response to the challenge to confirm that computing device 102 is authorized to register. S-CSCF 304 then transmits to the 302 a SIP 200 OK indicating the registration is complete. Also in response to the registration in block 312, as indicated by arrow 314, S-CSCF 304 sends a third-party registration message to TAS 306 on behalf of UE 302. In this example, the third-party registration message is SIP REGISTER message 316. Examples of third-party registration are described in 3GPP TS 24.229 (v13.5.1) § 5.4.1.7. Message 316 can include position data or other location information provided by the UE 302, if any.

At block 318, TAS 306 processes message 316. The TAS 306 can, in this and other examples, determine a location request 320, e.g., based at least in part on any location information forwarded from the UE 302 in message 316. The TAS 306 can transmit the location request 320 to LRF 308. LRF 308 can determine that the location of UE 302 is unknown. LRF 308 can transmit a location response 322 to TAS 306 indicating that the location is unknown. In response, TAS 306 can determine that the registration cannot be completed. TAS 306 can then reply to S-CSCF 304 with a SIP 5xx (or "five-xx") failure response, e.g., a SIP 503 response 324.

As indicated by the dashed arrow and block 326, S-CSCF 304 can, upon receiving response 324, process a de-registration of the UE 302. The de-registration can include transmitting a SIP NOTIFY to any subscribers to the "reg" event package. However, in this example, the UE 302 is not subscribed to the "reg" event package, so is not notified of the deregistration.

As indicated by dashed arrow 328, in response to the SIP 200 OK after block 312, UE 302 attempts to subscribe to the "reg" event package. UE 302 transmits a SIP SUBSCRIBE message 330 ("Event: reg") to S-CSCF 304. However, the processing on the UE 302 in response to the registration (beginning at arrow 328) can be performed in parallel with the processing on the S-CSCF 304 and TAS 306 (beginning at arrow 314). Since UE 302, S-CSCF 304, and TAS 306 do not operate in synchronization with each other, S-CSCF 304 may not receive message 330 until after the de-registration in block 326 is complete, e.g., as shown. This is a race condition, which reduces system robustness. In this example, the SUBSCRIBE after de-registration causes the S-CSCF to reject message 330 as an attempt by a non-registered device (UE 302) to subscribe. S-CSCF 304 can therefore transmit a failure indication 332, e.g., a SIP 403 Forbidden failure indication 332, to UE 302 in response to message 330.

In some prior schemes, upon receipt of failure indication 332, UE 302 backs off for a fixed or pseudo-random amount of time, and then attempts to re-register. However, in some examples, when the UE 302 makes the attempt, the location of UE 302 is still unknown. As a result, the same sequence of events repeats, and the registration is unsuccessful. In some examples, the UE 302 may retry, e.g., three times, and each retry may fail. The sequence of events in FIG. 3, and retries thereof, can consume network bandwidth both in the access network and in the core network without benefit.

Some examples result in even more bandwidth consumption. For example, at block 318, the TAS 306 may additionally or alternatively make a request to an HLR, consuming even more core bandwidth. Moreover, after block 312, the S-CSCF 304 may perform multiple third-party registrations in parallel, e.g., to the TAS and to a messaging server such as an Instant Messaging and Presence (IMP) AS. Some of those third-party registrations may succeed even if the registration to TAS 306 fails. For example, IMP servers frequently do not require location information, so can process third-party registrations even without that information. However, upon receipt by the S-CSCF 304 of the SIP 503 message from TAS 306, S-CSCF 304 must de-register UE 302 from the IMP AS or other ASes, further increasing core traffic.

Figure 4:
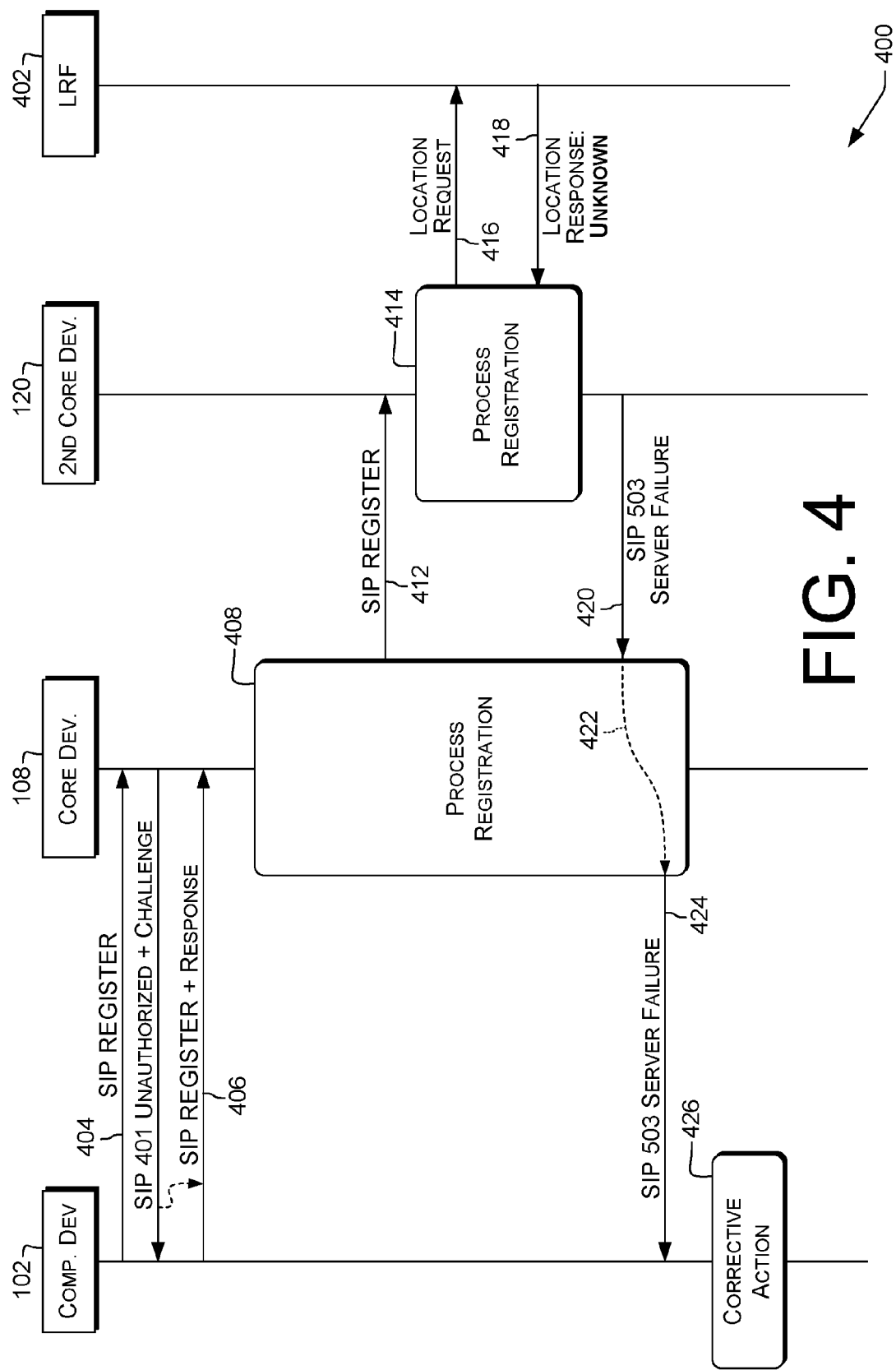
FIG. 4 shows a call flow illustrating an example registration process, in accordance with some examples of the present disclosure.

FIG. 4 shows a call flow 400 illustrating an example failure of a staged setup process, e.g., from computing device 102 representing a VoLTE UE, to an IMS-based telecommunications network 106, according to various examples of the present disclosure. Computing device 102 communicates with core network device 108, e.g., an S-CSCF, and second core network device 120, e.g., a TAS. Other components of telecommunications network 106, e.g., an authorization server, are omitted for brevity. Core network device 108 or (as shown) second core network device 120 can communicate with LRF 402, which can represent information server 122, FIG. 1. LRF 402 can be implemented as a standalone server or other core network device, or as one of multiple functions carried out by a server or other core network device.

Computing device 102 transmits, to core network device 108, a message 404 including a registration request 124, e.g., a SIP REGISTER request. Core network device 108 responds with a SIP 401 Unauthorized and a challenge, as described above with reference to FIG. 3. In response, as indicated by the dashed arrow, computing device 102 transmits a message 406 including the registration request 124 and the response to the challenge. Message 406 can include a correct response but can omit location information, or can include expired, incomplete, or invalid location information, in some examples such as those discussed below. In some examples, message 406 is the only registration message the UE is required to send, and any other necessary registrations are handled via third-party registrations processed by core network device 108. Examples are discussed below.

At block 408, core network device 108 processes the registration indicated in registration request 124 of message 406. For example, core network device 108 can perform authentication or authorization processing, e.g., including message exchanges with authorization functions of information server 122. In some examples, core network device 108 can communicate with. an information server 122, e.g., an HSS, to validate the computing device 102. Examples are discussed herein, e.g., with reference to block 614.

At or after block 408, core network device 108 can commence third-party registration. This can be done, e.g., in response to successful processing of the registration or in response to successful validation of computing device 102. Unlike FIG. 3, in this and other examples, core network device 108 does not transmit a SIP 200 OK to the computing device 102 upon completion of the registration. Instead, in this and other examples, core network device 108 can transmit message 412 to second core network device 120. In this example, second core network device 120 is an example of a "mandatory network device," i.e., a network device for which failure to process message 412 requires that processing of message 406 be considered to have failed, at least in part. In some examples, even if processing in block 408 is successful, a failure response is returned to computing device 102 if processing in block 414 by the mandatory second core network device 120 fails. In contrast to mandatory network devices, as used herein, a "discretionary network device" is a second core network device 120 or other network device for which failure in processing does not require that processing of message 406 be considered to have failed. For example, if processing of a third-party registration by an IMP AS fails, processing of the overall registration triggered by message 406 can still succeed. Message 412 can include at least some information copied or derived from message 406, in some examples.

In some examples, block 408 can include at least selecting second core network device 120 or determining message 412 based at least in part on iFCs (Initial Filter Criteria), e.g., retrieved from an HSS and corresponding to a particular user of computing device 102. Block 408, e.g., carried out by an S-CSCF, can search the contents of an incoming message, e.g., message 406, for strings that match patterns in the iFCs. If a match of a particular pattern is found, block 408 can include performing instructions in the iFC associated with that pattern. For example, for iFCs for the REGISTER SIP method, the iFCs can include patterns matching feature tags found in the Contact header in the SIP REGISTER message. The instructions associated with those patterns can include instructions to send third-party registration(s) (TPR(s)) to the corresponding AS(es) that handle the feature(s) indicated by the Contact-header feature tags. iFCs can also be used in determining or triggering other actions or messages.

Second core network device 120 can process the third-party registration at block 414. Block 414 can include transmitting a location request 416 to LRF 402 and receiving a location response 418 from LRF 402, e.g., as discussed herein with reference to FIG. 3. The location request 416 can include location information copied or derived from message 406 (conveyed via message 412), if any. The location response 418 can indicate that the location is unknown.

In some examples, computing device 102 does not provide location information (e.g., position information or other location information), e.g., in message 406. For example, computing device 102 can be an inexpensive feature phone that does not include a receiver for GPS or other radionavigation signals and so cannot provide coordinates.

In some examples, computing device 102 provides location information that is inaccurate or that cannot be verified. For example, some mobile phones that are not standards-compliant transmit timestamps in local time with no time-zone information, instead of with time-zone information or in UTC. As a result, some core network devices cannot verify whether the location information provided by such mobile phones is sufficiently current to meet legislative or regulatory mandates related to the provision of emergency services (e.g., 911 service). In some examples, regulations may require that position or location information be at most two hours old. For example, in time zones UTC+3-UTC+14 (or UTC+($\geq$3)), if local time is transmitted without a time-zone offset, the timestamp may be considered to be UTC, but three or more hours old (e.g., at 8:00 UTC, UTC+3 is 11:00, or three hours later). This may result in timestamped location data being considered too old for use, e.g., more than two hours old. In some examples, second core network device 120 or LRF 402 can ignore timestamps and use whatever location information is provided by computing device 102, e.g., an ECGI of a recently-connected eNodeB. However, this may result in making inaccurate assumptions about the position of computing device 102.

In some examples, computing device 102 can provide invalid location information. For example, the computing device 102 can provide a dummy or constant ECGI value rather than an ECGI value of an actual eNodeB within range of the computing device 102. Additionally or alternatively, the computing device 102 can transmit blank or mis-formatted location information, e.g., if the computing device 102 has been out of cellular range for more than two hours (such as while in an aircraft on a flight longer than two hours).

In some examples, the computing device 102 can transmit location information that is not usable by core network devices 108 or 120. For example, a cellular phone roaming in a visited operator's network can provide the visited ECGI to a home operator's S-CSCF (core network device 108). However, the home operator may not have the necessary information to determine a position from that ECGI, since the home operator may not have access to the visited operator's cell-coverage databases.

In some examples, computing device 102 is connected to network 106 via a WIFI access network 110 or other location-agnostic access network. In some of these examples, the access network 110 does not provide location information for computing device 102. As used herein, a "location-agnostic" access network is an access network that does not, as part of the normal operation of the access network, provide location information for devices connected to that network. Examples of location-agnostic access networks can include WIFI networks or other IEEE-standardized wireless networks; Ethernet or other wired networks. Location-agnostic networks can be, e.g., used to establish connections to core network devices via public data network connections such as the Internet, or via an LTE Evolved Packet Data Gateway (ePDG).

In some examples, access devices for location-agnostic networks, e.g., WIFI access points (APs), do not store position information for themselves or for connected users, so cannot provide position information. Moreover, the ePDG or network devices such as firewalls or routers may frame, tunnel, or otherwise modify the packets from an access device, preventing using IP geolocation to determine location information. By contrast, access devices for a 3GPP access or other location-aware access network, such as eNodeBs in the EUTRAN, can provide position or other location information, e.g., Location Area Identification (LAI), EUTRAN Cell Identity (ECI), or ECGI values, to core network device 108. LAI values can include an MCC, an MNC, and a Location Area Code (LAC). In some examples, a location-aware access network can provide coordinates of the UE.

In some examples, computing device 102, e.g., when connected via a location-agnostic access network, can provide in message 406 identification or location information of the last location-aware access device to which computing device 102 was connected. For example, computing device 102 can provide the ECGI of the last eNodeB to which computing device 102 was connected, together with a timestamp indicating when the computing device 102 was last connected to that eNodeB. However, the timestamp may be incorrect, lacking time-zone information, or the location information may be older than a predetermined time period. For example, a regulatory requirement that location information be newer than two hours old would prevent using the last-connected ECGI if the timestamp indicates a time more than two hours in the past. Therefore, even if computing device 102 provides information of a last-connected access device, it may not be possible or practical for the core network devices 108 or 120, or the LRF 402, to rely on that information in determining a location of the computing device 102.

In some examples, e.g. in the absence of location information from the computing device 102 or access network 110, LRF 402 can be configured to access location information from an HLR/HSS based on, e.g., the IMSI, IMEI, or telephone number of computing device 102, or other information in message 406. However, some prepaid mobile phones and other prepaid computing devices 102 do not include physical-address information in the subscriber profile stored in the HLR/HSS. Therefore, if the computing device 102 does not provide usable location information, and the access network 110 does not provide usable location information, and the subscriber profile does not include usable location information, the LRF 402 can indicate (via location response 418) that the location is unknown.

Above are given various examples in which the computing device 102 may not provide usable location information, in which the access network 110 does not provide usable location information, or in which the subscriber profile does not include usable location information. The above examples are nonlimiting. As used herein, the location being "unknown" means that location information is absent, too old, out of compliance with technical, statutory, or regulatory requirements, or otherwise not usable. Various aspects herein can operate whenever the location is unknown (e.g., usable location information is absent), e.g., due to any of the above-listed reasons; bugs or software failure of network component(s); cosmic-ray-induced data corruption; malicious activity such as Rowhammer attacks; or any other cause.

In response to the location response 418 indicating that the location is unknown, second core network device 120 can determine that the registration cannot be completed. Second core network device 120 can then reply to core network device 108 with a SIP 5xx failure response, e.g., a SIP 503 response 420.

The core network device 108, e.g., still at block 408, can receive response 420. Core network device 108 can then, as indicated by the dashed arrow 422, provide a failure message 424 to computing device 102 indicating that the registration was unsuccessful. In this and other examples, failure message 424 is a SIP 503 Server Failure response. In some examples, failure message 424 is or comprises information identifying to the computing device 102 that a retry is unlikely to be successful unless something about the request changes.

In this and other examples, computing device 102 can respond to failure message 424 by taking corrective action (block 426). For example, at block 426, computing device 102 can back off (i.e., not retry the registration) for a predetermined period of time. In some examples, at block 426, computing device 102 can prompt the user for location information, and then retry the registration using the user-provided location information. In some examples, at block 426, computing device 102 can prompt the user to communicate with the operator, e.g., by presenting a "call customer service?" prompt on display 218.

In some examples, at block 426, computing device 102 can attempt to connect via a different access network that might provide location information. For example, if messages 404, 406, and 424 are transmitted via a WIFI access network, block 426 can include retrying via a 3GPP access network such as LTE, or another location-aware access network. Examples of corrective action at block 426 are discussed below with reference to FIGS. 9 and 10.

In the example of FIG. 4, unlike the example of FIG. 3, failures of the third-party registration do not result in the computing device 102 being de-registered without its knowledge. Failures of the third-party registration also do not result in registration/deregistration cycles to other ASes, e.g., an IMP AS. This and other examples can save both core and access bandwidth. This savings of data transfer over the access network can reduce the time and energy required to conduct the staged setup, which can increase performance of network 106 for multiple users, and can increase battery life of a portable computing device 102. Some examples herein reduce signaling traffic, as described herein, by not sending a SIP 200 OK from the core network device 108; by not conducting other third-party registrations and deregistrations to ASes other than the second code network device 120; and by not retrying, at the UE, a request that will not succeed. This can reduce at least four signaling exchanges per application server. The reduction in bandwidth used can reduce the probability of network overload or outage.

The example of FIG. 4 shows a second core network device 120 which requires location information. For example, a TAS may require location information to satisfy emergency-services requirements, as discussed above. This is not limiting, and examples herein can be used with any combination of mandatory or discretionary network devices that do or do not require location information (for a total of four options per network device). For example, machine-to-machine communications may involve a TAS or other AS that does not require location information.

Illustrative Processes

Figure 5:
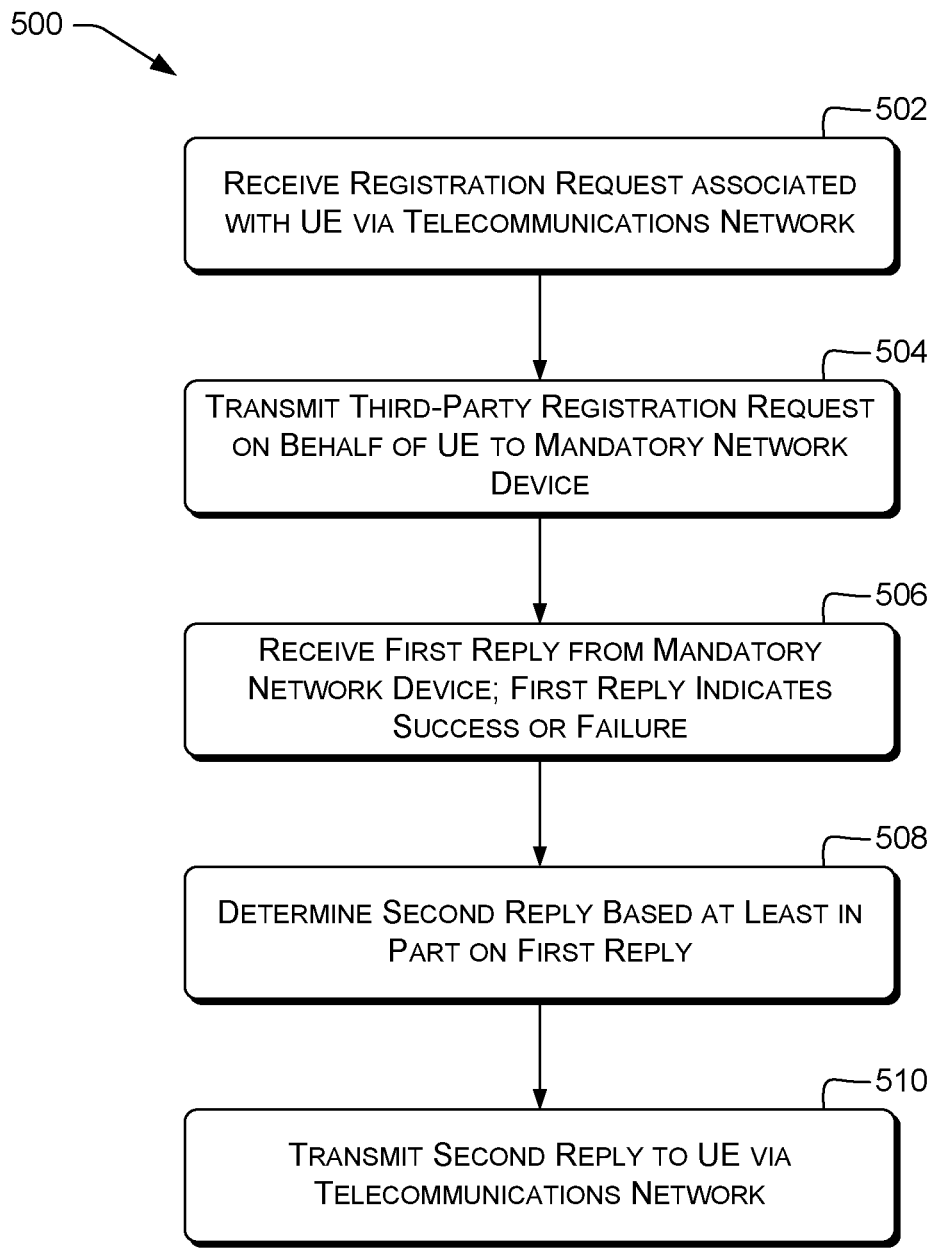
FIG. 5 illustrates an example process for processing a request to register user equipment (UE) to a telecommunications network, in accordance with some examples of the present disclosure.

FIG. 5 illustrates an example process 500 for processing a registration of a computing device 102 with a network 106, in accordance with some examples of the present disclosure. Process 500 can be performed, e.g., by a network device communicatively connectable with UE, e.g., core network device 108 or other server(s) 204. Core network device 108 can include a communications interface 234, as discussed above. Core network device 108 can include, e.g., an S-CSCF. Process 500 can be performed by a core network device of a telecommunications network 206. Examples of blocks 502-510 are discussed above with reference to block 408 and messages 420 and 424. In some examples, the core network device 108 includes one or more processors 228 configured to perform operations described below, e.g., in response to computer program instructions of the request-processing module 232.

Operations shown in FIGS. 5-10 can be performed in any order except when otherwise specified, or when data from an earlier step is used in a later step. Any operation shown in multiple figures can be as discussed with reference to the first figure in which that operation is shown. In some examples, blocks 502, 504, 506, 508, and 510 can be performed in that order. In some of these and other examples, an S-CSCF can wait to respond to the UE until the TAS registration succeeds. This can save bandwidth and battery power, as discussed herein.

For clarity of explanation, reference is herein made to various components shown in FIGS. 1 and 2, and messages shown in FIG. 4, that can carry out or participate in the steps or operations of the exemplary method. It should be noted, however, that other components can be used; that is, exemplary method(s) shown in FIGS. 5-10 are not limited to being carried out by the identified components.

At 502, core network device 108 can receive a registration request (or other request, e.g., deregistration or subscription request, and likewise throughout) associated with a user equipment (UE), e.g., computing device 102. The registration request can include, e.g., a SIP REGISTER request, e.g., as discussed herein with reference to message 406.

At 504, core network device 108 can transmit a third-party registration request on behalf of the UE via the telecommunications network 206 to a mandatory network device. Examples are discussed herein, e.g., with reference to message 412. The third-party registration request can include, e.g., a SIP REGISTER request. As discussed above, e.g., with reference to block 408, if processing at the mandatory network device fails, processing of the registration request is considered to have failed, at least in part.

At 506, core network device 108 can receive a first reply from the mandatory network device via the telecommunications network. The first reply can include a SIP response. The first reply can indicate success or failure of the third-party registration request, e.g., via a SIP response code. Examples are discussed herein, e.g., with reference to message 420.

At 508, core network device 108 can determine a second reply based at least in part on the first reply. The second reply can include a SIP response. The second reply can include, e.g., a SIP 200 OK or SIP 4xx (or "four-xx") or 5xx error response code. Examples are discussed herein, e.g., with reference to message 424. For example, block 508 can include, in response to the first reply indicating failure of the third-party registration request, determining the second reply indicating failure of the registration request. For example, failure of a third-party registration request (e.g., message 412) to a mandatory network device (e.g., second core network device 120) can result in failure of the registration request (e.g., message 406).

At 510, core network device 108 can transmit the second reply to the UE via the telecommunications network 206. Examples are discussed herein, e.g., with reference to message 424.

Figure 6:
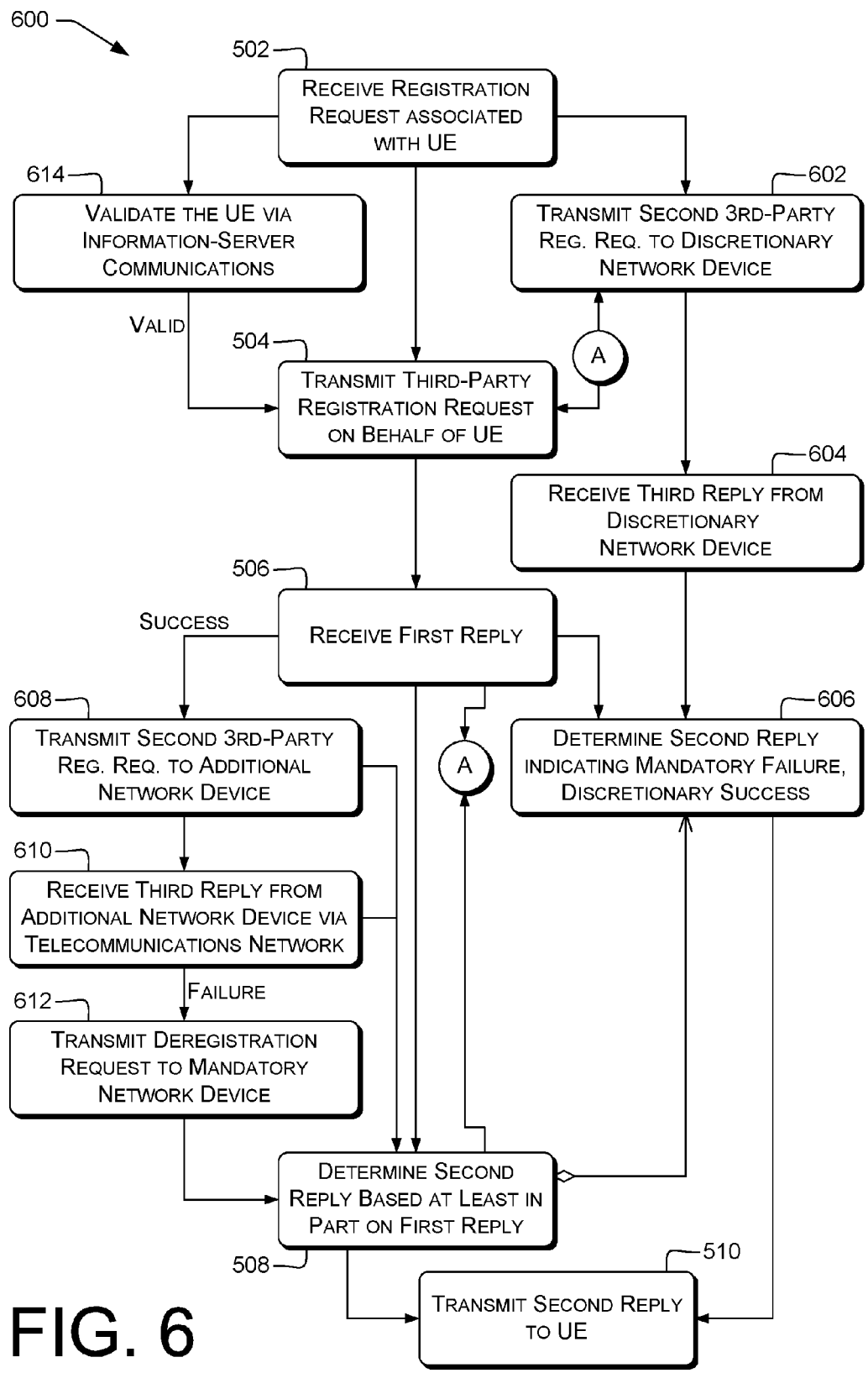
FIG. 6 illustrates an example process for processing a registration request, in accordance with some examples of the present disclosure.

FIG. 6 illustrates an example process 600 for processing a registration request, in accordance with some examples of the present disclosure. Process 600 can be performed, e.g., by a core network device, e.g., core network device 108 or other devices described above. In some examples, block 502 can be followed by block 602 or block 610. In some examples, block 506 can be followed by block 606 or block 608. In some examples, block 508 can include block 606. In some examples, block 502 can be followed by block 614.

In some examples, registration with discretionary network devices can be performed in parallel with registration with mandatory network devices. This can reduce the amount of time required to perform a registration. In some of these examples, block 502 is followed by block 602.

At 602, core network device 108 can, after receiving the registration request (block 502) and before receiving the first reply (block 506), transmit a second third-party registration request on behalf of the UE via the telecommunications network 206 to a discretionary network device. Examples are discussed above, e.g., with reference to an IMP AS.

At 604, core network device 108 can receive a third reply from the discretionary network device via the telecommunications network 206. The third reply can indicate success or failure of the second third-party registration request. For example, the third reply can include a SIP response having a response code indicating success (1xx or 2xx) or failure (4xx, 5xx, or 6xx).

At 606, e.g., after both block 506 and block 604, core network device 108 can determine the second reply to be sent to the UE. In response to the first reply indicating failure of the third-party registration request to the mandatory network device, and the third reply indicating success of the second third-party registration request to the discretionary network device, core network device 108 can determine the second reply indicating the failure of the (mandatory) third-party registration request and the success of the (discretionary) second third-party registration request. In this and other examples determining a second reply including information about the success or failure of multiple third-party registrations, the second reply can include at least one custom header indicating such success(es) or failure(s). In some examples, the second reply can include a respective header for each third-party registration that carries information about that third-party-registration, e.g., "X-Mandatory-AS-1: success". In some examples, a single header can carry information of multiple third-party registrations, e.g., "X-3rd-Party-Regs: +AS1, −AS2" to indicate success of the registration to AS1 and the failure of registration to AS2.

In some examples, block 506 or block 508 (or block 606, which can be included in block 508) can be followed by block 504 or block 602 (connector A). This can permit performing registration attempts with any number of mandatory or discretionary network devices in any order, and in any serial or parallel combination(s). In some examples, as discussed herein with reference to block 602, registration attempt(s) are performed for discretionary network device(s) in parallel with registration attempt(s) to mandatory network device(s).

In some examples, registration to discretionary network device(s) is carried out after registration to mandatory network device(s) succeeds. This can reduce network bandwidth consumed by registration in situations in which registration fails with respect to at least one mandatory network device. In some examples, block 506 is followed by block 608.

At 608, core network device 108 can, in response to the first reply indicating that the third-party registration request was successful ("Success" arrow), transmit a second third-party registration on behalf of the UE via the telecommunications network 206 to an additional network device, e.g., a mandatory network device or a discretionary network device. Examples of a discretionary network device are discussed above, e.g., with reference to the IMP AS and block 602. Block 608 can be followed by block 508, which can include block 606. In some examples including block 608, block 606 can include determining the second reply based on the status of the registration to the additional network device, since block 608 is only performed (in some examples) if the registration to the mandatory network device succeeds. For example, block 606 can include determining the second reply indicating the same success or failure of the registration request as a third reply indicates of the second third-party registration request to the additional network device. In some examples, block 608 can be followed by block 610.

At 610, core network device 108 can receive a third reply from the additional network device via the telecommunications network, the third reply indicating success or failure of the second third-party registration request. Examples are discussed herein, e.g., with reference to block 606. Block 610 can be followed by block 508 or block 612 ("Failure"). In some examples using block 608, e.g., as described above, block 508 can include determining the second reply indicating the same success or failure of the registration request as the third reply indicates of the second third-party registration request.

At 612, core network device 108 can, in response to the third reply indicating failure of the second third-party registration request, transmit a deregistration request (or other removal request) associated with the UE to the mandatory network device. For example, the additional network device can be a second mandatory network device. In some examples, block 612 can include at least one of awaiting a deregistration reply from the mandatory network device or determining that deregistration was successful. Removal requests can include deregistration, unsubscription, disconnection, or other teardown requests.

In some examples, if third-party registration succeeds at a first mandatory network device but fails at an additional mandatory network device, block 612 can include deregistering the UE from the additional mandatory network device. This can permit maintaining consistent registration state of the UE at the core network device 108 and any second core network device(s) 120. In some examples, functions of block 612 can be performed with respect to discretionary network devices or to multiple mandatory or discretionary network devices, in any combination. For example, if third-party registrations to one or more mandatory or discretionary network devices have succeeded and then a third-party registration to another mandatory network device fails, core network device 108 can deregister the UE from the one or more mandatory or discretionary network devices before replying to the UE (block 510).

At 614, core network device 108 can communicate with information server 122 to validate the UE. In some examples, registration can proceed to block 504 only if the UE is valid ("Valid"). Examples are discussed herein, e.g., with reference to blocks 814 and 816, FIG. 8. For example, attempts to register by a UE that is blocked, has an expired or invalid subscription, or is otherwise not authorized to register can be refused before commencing third-party registration. This can reduce core-network bandwidth consumption.

Figure 7:
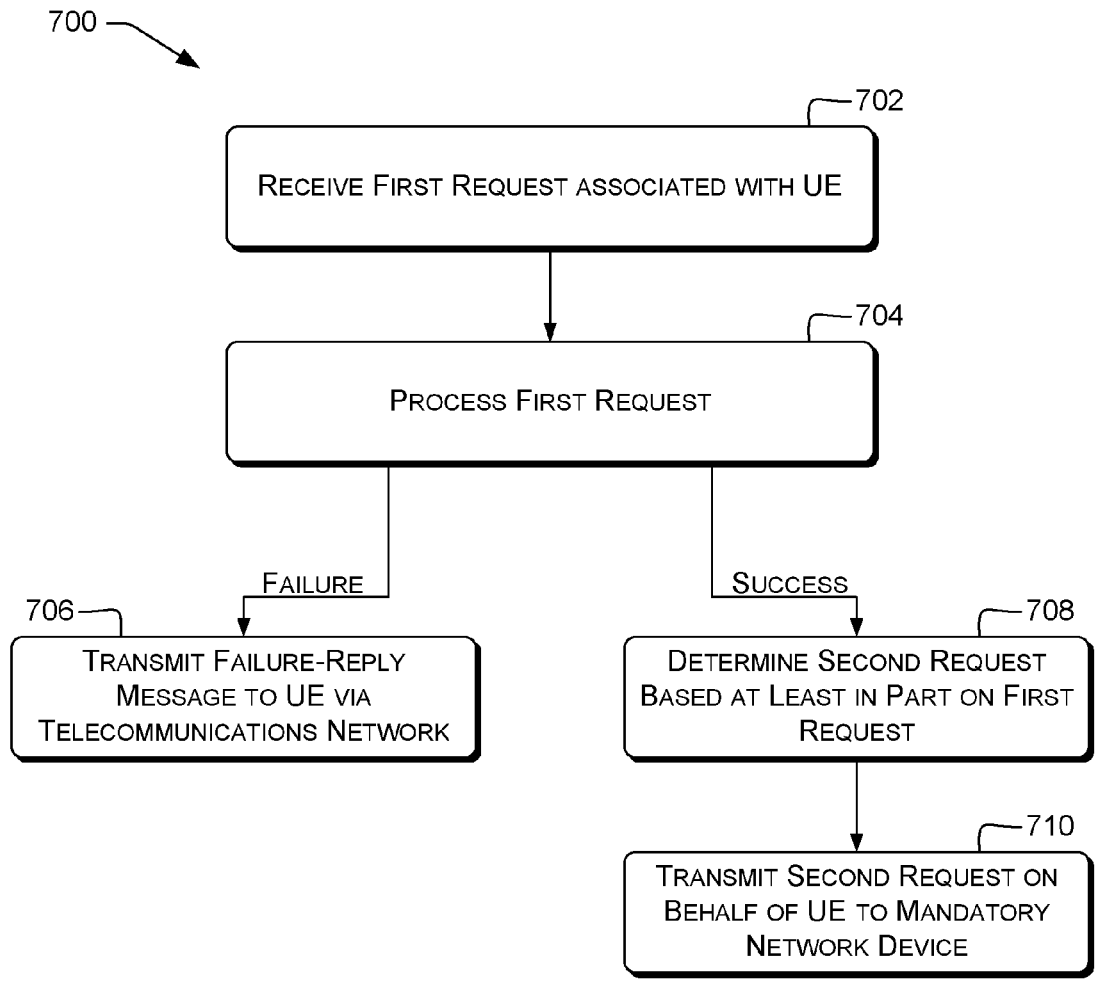
FIG. 7 illustrates an example process for processing a request associated with UE, in accordance with some examples of the present disclosure.

FIG. 7 illustrates an example process 700 for processing a request associated with a UE, e.g., computing device 102, in accordance with some examples of the present disclosure. Process 700 can be performed, e.g., by a core network device of a telecommunications network 206, e.g., core network device 108 or other devices described above, such as an S-CSCF. In some examples of process 700, an S-CSCF does not start third-party registration until processing at the S-CSCF has been successful.

At 702, core network device 108 can receive a first request associated with a user equipment (UE), e.g., computing device 102. The first request can be or include, e.g., a registration request, deregistration request, subscription or unsubscription request, or other request.

At 704, core network device 108 can process the first request and determine a success or failure of the processing of the first request. In some examples of a registration request, the core network device 108 can perform registration processing as described in TS 24.229 § 5.4.1.2.1. In some examples, block 704 can include at least authenticating the request; determining whether the request is authorized; or updating database(s) or other stored information based at least in part on the content of the request. Processing at block 704 can fail, e.g., if the request is malformed, transmitted by an unknown or unauthorized user, or transmitted without appropriate user credentials.

At 706, in response to failure of the processing, the core network device 108 can transmit a failure-reply message, e.g., a SIP response, to the UE via the telecommunications network. For example, the failure-reply message can include a SIP 4xx, 5xx, or 6xx response or other appropriate response to the request. In some examples, block 706 can include determining the failure-reply message including a first error code, e.g., a SIP 4xx such as a SIP 403. In some examples, the failure-reply message can be associated with a first error code, e.g., an error code reserved for use in the failure-reply message and not used in the second reply discussed below with reference to blocks 804, 806, or 810.

At 708, in response to success of the processing, core network device 108 can determine a second request based at least in part on the first request. For example, the first request can be a SIP REGISTER request. The second request can be a third-party registration request, e.g., a third-party SIP REGISTER request as described in TS 24.229 § 5.4.1.2.2F. In some examples, the first and second requests can be SUBSCRIBE requests. The first and second requests can be of the same type, e.g., the same SIP request method, or of different types.

At 710, core network device 108 can transmit the second request on behalf of the UE via the telecommunications network to a mandatory network device. Examples are discussed above, e.g., with reference to message 412.

In some examples, if the processing of the first request succeeds at block 704, the core network device 108 does not immediately transmit a success reply to the UE or other requestor. Instead, as discussed herein with reference to FIG. 4, the core network device 108 communicates with mandatory network device(s) before determining a reply to the first request. Examples are discussed herein, e.g., with reference to FIG. 8.

Figure 8:
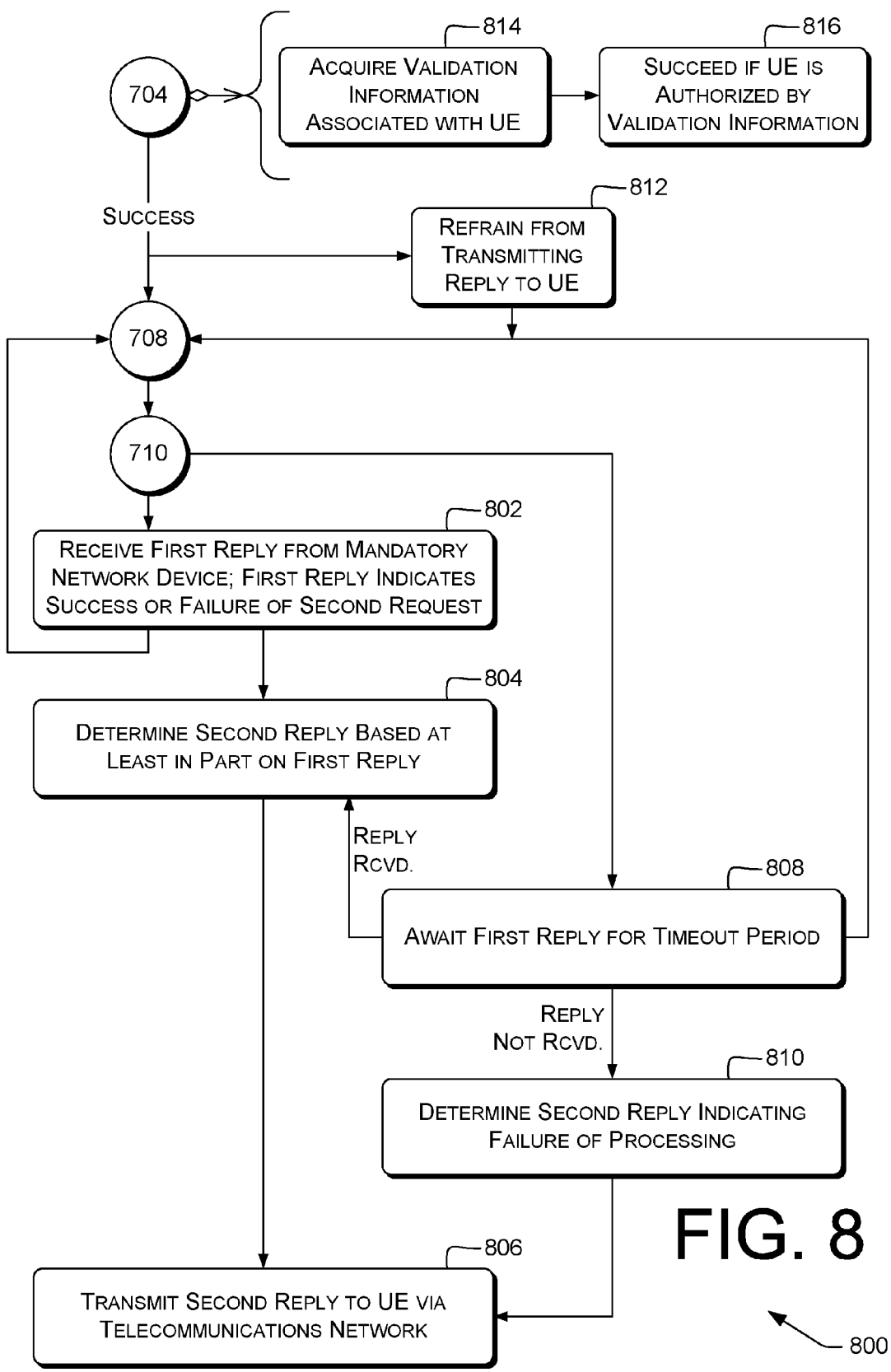
FIG. 8 illustrates an example process for processing a UE-associated request, in accordance with some examples of the present disclosure.

FIG. 8 illustrates an example process 800 for processing a request associated with a UE, e.g., computing device 102, in accordance with some examples of the present disclosure.

Process 800 can be performed, e.g., by a core network device, e.g., core network device 108 or other devices described above, such as an S-CSCF. Process 800 can be performed in response to success of processing at block 704, FIG. 7. In some examples, block 710, FIG. 7, can be followed by block 802 or block 808. In some examples, block 704 can be followed by block 812. In some examples, block 704 can include blocks 814 and 816.

At 802, core network device 108 can receive a first reply from the mandatory network device. The first reply can indicate success or failure of the second request. Examples are discussed herein, e.g., with reference to block 506. As shown, block 802 can be followed by block 708. This can permit communicating with multiple mandatory network devices before transmitting a reply to the UE.

At 804, core network device 108 can determine a second reply, e.g., a SIP response, based at least in part on the first reply. Examples are discussed herein, e.g., with reference to block 508. In some examples, in response to the first reply indicating failure of the second request, block 804 can include determining the second reply including a second error code different from the first error code discussed above with reference to block 706, e.g., a SIP 5xx such as a SIP 503. Using different error codes to distinguish failures at block 704 from failures at the mandatory network device (or device(s)) (indicated by the first reply) can permit the UE to take appropriate action depending on the type of error. This can reduce unsuccessful retries by the UE, and the corresponding power and bandwidth consumption. Examples are discussed herein, e.g., with reference to block 426 or FIGS. 9-10.

At 806, core network device 108 can transmit the second reply to the UE via the telecommunications network. Examples are discussed herein, e.g., with reference to block 510.

In some situations, a mandatory network device may be down or otherwise nonresponsive. In some of these situations, a request to a mandatory network device may timeout without reply. In some examples, accordingly, block 708 is followed by block 808.

At 808, core network device 108 can await, for a predetermined timeout period, the first reply from the mandatory network device. The predetermined timeout period can be, e.g., about, less than about, or greater than about, any of the following: 1 ms, 2 ms, 5 ms, 10 ms, 20 ms, or 50 ms. If a reply is received during the timeout period, block 808 can be followed by block 804 ("Reply Rcvd."). Otherwise, block 808 can be followed by block 810 ("Reply not Rcvd.") or block 708. In some examples in which block 808 is followed by block 708, core network device 108 can process multiple third-party requests. Core network device 108 can then report to the UE, e.g., via the second reply, which third-party requests succeeded or failed. Block 808 can be performed after transmitting the second request (block 710) or in response to success of processing (block 704).

At 810, in response to expiration of the timeout without receiving the first reply, core network device 108 can determine the second reply indicating failure of the processing. Block 810 can be followed by block 806, at which core network device 108 can transmit the second reply to the UE via the telecommunications network.

At 812, in some examples, in response to success of the processing at block 704, core network device 108 can refrain from transmitting a reply to the UE before receipt of a reply to the second request (block 802). Block 812 can be followed by, or included in, block 708 or block 710.

At 814, e.g., as part of processing at block 704, core network device 108 can acquire validation information associated with the UE from an information server 122. The information server 122 can be an HLR, HSS, or other server described above. In some examples, block 814 can include transmitting a query to the information server 122 via a network, and receiving a response via the network at the core network device 108.

At 816, in response to the validation information from the information server 122 indicating the UE is authorized to submit the first request, core network device 108 can determine that the processing (block 704) has succeeded. Some examples using blocks 814 and 816 can reduce network traffic by avoiding third-party registrations for a user or UE who is blocked or otherwise invalid.

Figure 9:
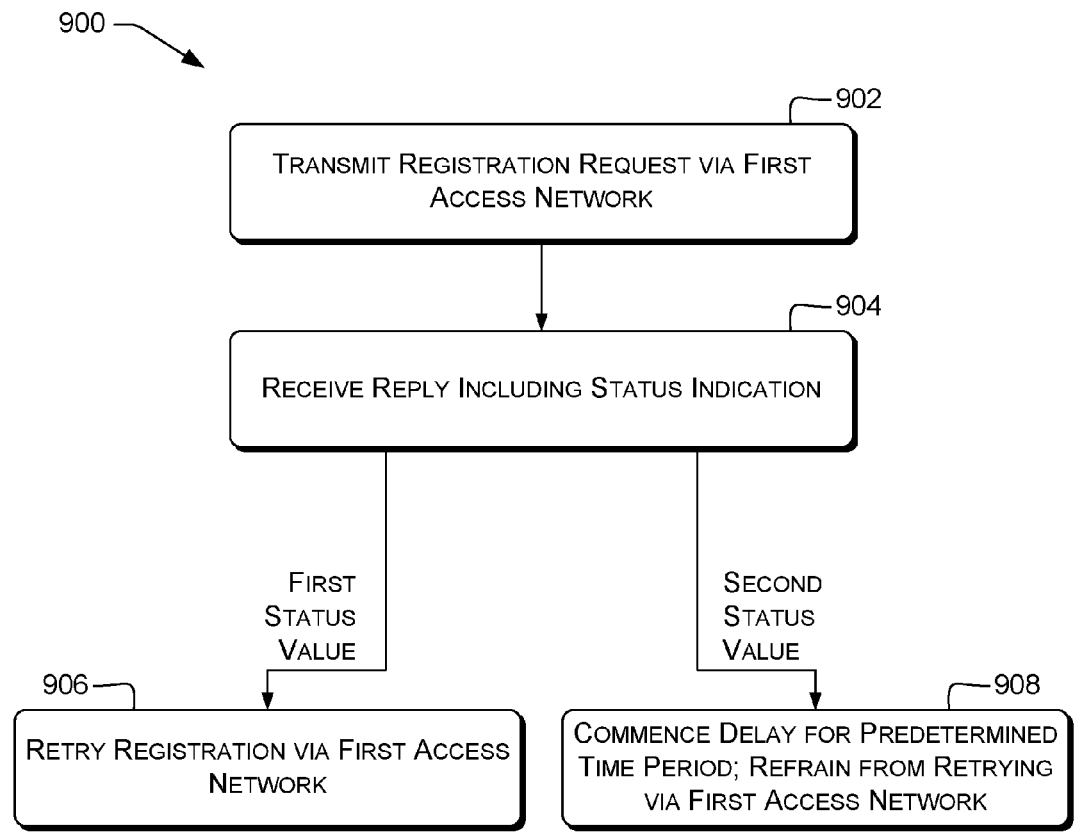
FIG. 9 illustrates an example process for registering with a telecommunications network, in accordance with some examples of the present disclosure.

FIG. 9 illustrates an example process 900 for retrying requests, e.g., registration requests, in accordance with some examples of the present disclosure. Process 900 can be performed, e.g., by user equipment or other computing devices 102 (or 104, and likewise throughout the following discussion). Computing device 102 can include a communications interface such as communications interface 220, e.g., connected to radio(s) 222, as discussed above. The communications interface 220 can be configured to communicate via a first access network 110. In some examples, the computing device 102 includes one or more processors 212 configured to perform operations described below, e.g., in response to computer program instructions of the client application 226. In some examples, the first access network 110 is a location-agnostic network, as discussed above. In some examples, the first access network 110 is a wireless network. In some examples, the first access network 110 is a location-agnostic wireless network, e.g., WIFI.

At 902, computing device 102 can transmit a registration request (or other request, and likewise throughout this discussion), e.g., a SIP REGISTER request, via the first access network 110, to a core network device 108, e.g., an S-CSCF. Examples are discussed above, e.g., with reference to messages 404 and 406, FIG. 4. The registration request can be transmitted directly, or via other device(s), e.g., a P-CSCF. In some examples, the registration request is transmitted via a WIFI access network, e.g., to an ePDG that forwards the registration request to the S-CSCF.

At 904, computing device 102 can receive a reply, e.g., a SIP response, via the communications interface. The reply can include a status indication, e.g., a SIP response code.

At 906, in response to the status indication having a predetermined first value, computing device 102 can retry the registration request via the first access network. In some examples, the predetermined first value is associated with a transient failure or a failure due to factors the computing device 102 cannot control or influence. For example, the predetermined first value can be or include a SIP 403 response and can indicate a failure that may be correctable by a retry on the first access network 110.

At 908, in response to the status indication having a predetermined second value different from the predetermined first value, e.g., a SIP 503, computing device 102 can commence a delay to extend over a predetermined time period, e.g., one minute, five minutes, ten minutes, one hour, or another value. In some examples, the predetermined second value is associated with a semi-permanent failure or a failure due to factors under control of the computing device 102. During the delay, in some of these examples or in other examples, computing device 102 can refrain from retrying the registration request via the first access network 110. In some examples, the predetermined time period can be greater than five minutes. In some examples, the predetermined time period can be the longest retry time period implemented in the computing device 102. In some examples, during the predetermined time period, the registration request can be retried via a different access network, e.g., an LTE network. Block 908 can be an example of corrective action at block 426, FIG. 4.

Figure 10:
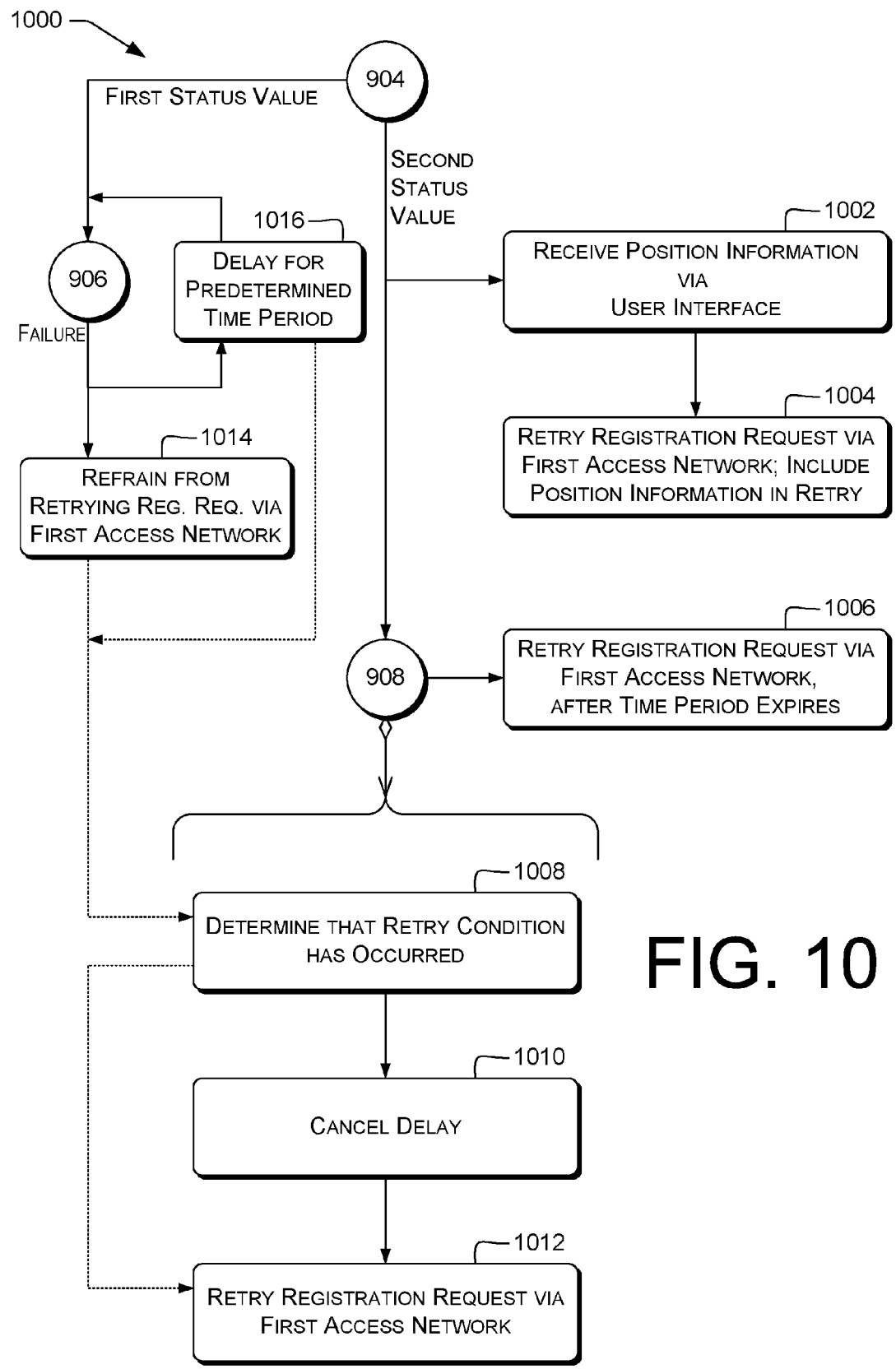
FIG. 10 illustrates an example of continuing a registration process to a telecommunications network, in accordance with some examples of the present disclosure.

FIG. 10 illustrates an example process 1000 for retrying requests, in accordance with some examples of the present disclosure. Process 1000 can be performed, e.g., by user equipment or other computing devices 102 (or 104, and likewise throughout the following discussion). In some examples, computing device 102 can include a user interface, e.g., user interface 216, FIG. 2. In some examples, block 904 is followed by block 1002. In some examples, block 908 is followed by block 1006. In some examples, block 908 is followed by, or (as shown) includes, blocks 1008, 1010, and 1012. Blocks 1002-1012 can be examples of corrective action at block 426, FIG. 4.

At 1002, in response to the status indication having the predetermined second value, computing device 102 can receive location information, e.g., position information, via the user interface 216. For example, at block 1002, computing device 102 can prompt a user of computing device 102 to provide a present street address or business name, a home address, a work address, coordinates, or other position information to computing device 102. Computing device 102 can then receive the location information via the user interface 216.

In some examples, block 1002 can include presenting, via the user interface 216, a message associated with the predetermined second value. For example, prior to receiving the location information via the user interface 216, computing device 102 can prompt the user as described above. In some examples, at block 1002, computing device 102 can prompt the user with a prompt not intended to solicit a response via the user interface 216. Such prompts can include, e.g., "please telephone customer service for assistance," or "please make sure your address information is on file with your cellular service provider." Block 1002 can include retrieving the message from computer-readable media 214, e.g., from a table indexed by values such as the predetermined second value.

At 1004, the registration request can be retried via the first access network 110. In examples using block 1002, the retried registration request can be determined based at least in part on the location information received via the user interface 216. For example, at least some of the location information can be included in a header or body of the retried registration request.

At 1006, computing device 102 can, subsequent to expiry of the predetermined time period of block 908, retry the registration request via the first access network.

In some examples, during the delaying (block 908), a condition may occur or change that increases the probability of success of a retry. Various examples described herein with reference to blocks 1008, 1010, and 1012 permit responding to such conditions. In some examples, as noted above, block 908 can include blocks 1008, 1010, and 1012.

At 1008, computing device 102 can determine that a retry condition has occurred. Retry conditions can include at least one of the following: a connection state associated with the first access network 110 has changed; a second access network is (or has become) available; a user command to restart communication via the first access network 110 has been received; the computing device 102 has been restarted or power-cycled; or a user command to restart registration-based service via the first access network 110 has been received.

For example, the connection state associated with the first access network 110 can change when the communications interface loses a connection (e.g., a WIFI association) and then regains a connection (e.g., re-associates with a WIFI access point). The connection state associated with the first access network 110 can additionally or alternatively change when the first access network 110 becomes unavailable, e.g., due to motion out of wireless range, and then becomes available again, e.g., due to motion back into wireless range. In some examples, a second access network, e.g., access network 112, can become available, e.g., due to motion into range of the second access network. The second access network can be of the same type as the first access network 110 (e.g., both WIFI or both LTE access networks) or of different types (e.g., one WIFI and one LTE).

In some examples, the user command to restart communication can be received via the user interface 216. The user command can include, e.g., a user sub-command to enable communications via the first access network 110, e.g., when disabling airplane mode on a cellular phone. The user command to restart communication can also include, e.g., a prior user sub-command to disable communications via the first access network 110, e.g., due to enabling airplane mode. A sequence of sub-commands to disable communications, and then to re-enable communications (a "cycle" command) is commonly employed by users experiencing communications difficulties, analogously to the often-effective advice that a personal-computer user faced with a problem with a computer should try turning it off and on again.

In some examples, the user command to restart registration-based service via the first access network 110 can be received via the user interface 216. As used here, "registration-based services" are network services that cannot be obtained without first registering with a core network device. For example, voice-over-WIFI (VoWIFI) calling via an IMS requires registering with an S-CSCF of the IMS before placing calls. The user command can include a user sub-command to enable a registration-based service, e.g., VoWIFI. The user command can also include, e.g., a prior user sub-command to disable the registration-based service, e.g., VoWIFI. In some examples, users can cycle particular registration-based services, e.g., VoWIFI, without cycling connectivity via the first access network. For example, a smartphone user can disable VoWIFI on a smartphone while still leaving the WIFI connection active and usable for data communications. The user can then subsequently re-enable VoWIFI, satisfying the retry condition of block 1008.

At 1010, in response to the determination at block 1008, computing device 102 can cancel the delay. Block 1010 can include, for example, stopping an internal timer or resetting or clearing data of a time-interval endpoint. Block 1010 can be carried out, e.g., after cycling WIFI connectivity or VoWIFI service.

At 1012, computing device 102 can retry the registration request. Block 1012 can include retrying the registration request via the first access network 110, the second access network, or another access network. In some examples in which the user has cycled first-access-network connectivity or a registration-based service, e.g., WIFI connectivity or VoWIFI service, block 1012 can include retrying the registration request via the first access network 110. In some examples in which a second access network has become available, e.g., because a smartphone user in a car has left a tunnel and is once again within range of an LTE access network, block 1012 can include retrying the registration request via the second access network.

In some examples, in response to the reply including the status indication having the first status value, block 904 is followed by block 906, as discussed above. In some examples, if the retrying the registration request at block 906 fails ("Failure"), block 906 is followed by block 1014.

At 1014, computing device 102 can refrain from retrying via the first access network as long as a retry condition has not been detected. Block 1014 can be followed by block 1008, or can include or be followed by blocks performing functions described herein with reference to blocks 1008, 1010, or 1012. Some examples using block 1014 can reduce network utilization while still maintaining usability by retrying once (or, in some examples, a finite number of times) in case a failure was due to a temporary or transient cause, and then refraining from retrying until a condition changes indicating that a retry might succeed. In some examples, block 1014 can be followed by block 1016, e.g., in response to computing device 102 determining that the retrying the registration request via the first access network has failed ("Fail").

At 1016, e.g., after retrying the registration request via the first access network (block 906), Computing device 102 can delay for a second predetermined time period, e.g., 1 min, 5 min, or other time periods described herein. Block 1016 can be followed by block 906 to retry again, or by block 1008 to await a retry condition. In some examples, computing device 102 performs at least one of the following sequence of blocks: (A) 906, 1016, 906, 1014; (B) 906, 1016, 906, 1016, 906, 1014; or (C) 906, any number of repetitions of 1016 and 906, 1014. In any of those sequences, blocks 902 and 904 can be performed before block 906, block 1008 can be performed after block 1008, or block 1012 can be performed after block 1008. Some of these examples can balance usability and network bandwidth, as described above, by capping the maximum number of retries before ceasing retry to await a retry condition.

In some examples in which blocks 1014 or 1016 are followed by block 1008, block 1008 can be followed by block 1012. This is graphically indicated by the dotted arrows on FIG. 10. For example, in situations in which functions of block 1008 are performed without first commencing a delay, there is no delay to cancel, so block 1010 can be omitted (or can perform no operations).

Example Clauses

A: A method comprising, by a core network device of a telecommunications network, performing the following operations in order: receiving a registration request associated with a user equipment (UE); transmitting a third-party registration request on behalf of the UE via the telecommunications network to a mandatory network device; receiving a first reply from the mandatory network device via the telecommunications network, the first reply indicating success or failure of the third-party registration request; determining a second reply based at least in part on the first reply; and transmitting the second reply to the UE via the telecommunications network.

B: The method according to paragraph A, further comprising, in response to the first reply indicating failure of the third-party registration request, determining the second reply indicating failure of the registration request.

C: The method according to paragraph A or B, further comprising, after receiving the registration request and before receiving the first reply, transmitting a second third-party registration request on behalf of the UE via the telecommunications network to a discretionary network device.

D: The method according to paragraph C, further comprising: receiving a third reply from the discretionary network device via the telecommunications network, the third reply indicating success or failure of the second third-party registration request; and in response to the first reply indicating failure of the third-party registration request and the third reply indicating success of the second third-party registration request, determining the second reply indicating the failure of the third-party registration request and the success of the second third-party registration request.

E: The method according to any of paragraphs A-D, further comprising, in response to the first reply indicating that the third-party registration request was successful, transmitting a second third-party registration request on behalf of the UE via the telecommunications network to an additional network device.

F: The method according to paragraph E, further comprising: receiving a third reply from the additional network device via the telecommunications network, the third reply indicating success or failure of the second third-party registration request; determining the second reply indicating the same success or failure of the registration request as the third reply indicates of the second third-party registration request; and in response to the third reply indicating failure of the second third-party registration request, transmitting a deregistration request associated with the UE to the mandatory network device.

G: The method according to any of paragraphs A-F, wherein the registration request and the third-party registration request comprise respective Session Initiation Protocol (SIP) REGISTER requests and the first reply and the second reply comprise respective SIP responses.

H: A method comprising, by a core network device of a telecommunications network, performing the following operations: receiving a first request associated with a user equipment (UE); processing the first request and determining a success or failure of the processing; in response to failure of the processing, transmitting a failure-reply message to the UE via the telecommunications network; and in response to success of the processing: determining a second request based at least in part on the first request; and transmitting the second request on behalf of the UE via the telecommunications network to a mandatory network device.

I: The method according to paragraph H, further comprising, in response to success of the processing, refraining from transmitting a reply to the UE before receipt of a reply to the second request.

J: The method according to paragraph H or I, further comprising, in response to the success of the processing: receiving a first reply from the mandatory network device, the first reply indicating success or failure of the second request; determining a second reply based at least in part on the first reply; and transmitting the second reply to the UE via the telecommunications network.

K: The method according to paragraph J, wherein the failure-reply message is associated with a first error code, the method further comprising, in response to the first reply indicating failure of the second request, determining the second reply including a second error code different from the first error code.

L: The method according to paragraph K, wherein the failure-reply message and the second reply are respective Session Initiation Protocol (SIP) responses, the first error code is a SIP four-xx response code, and the second error code is a SIP five-xx error code.

M: The method according to any of paragraphs H-L, further comprising, after transmitting the second request: awaiting, for a predetermined timeout period, a first reply from the mandatory network device; in response to expiration of the timeout without receiving the first reply, determining a second reply indicating failure of the processing; and transmitting the second reply to the UE via the telecommunications network.

N: The method according to any of paragraphs H-M, wherein the processing the first request comprises: acquiring validation information associated with the UE from an information server; and in response to the validation information indicating the UE is authorized to submit the first request, determining that the processing has succeeded.

O: The method according to any of paragraphs H-N, wherein the first request comprises a Session Initiation Protocol (SIP) REGISTER request and the second request comprises a SIP third-party registration request.

P: The method according to any of paragraphs H-O, wherein the core network device comprises a serving call session control function (S-CSCF) and the mandatory network device comprises a Telephony Application Server (TAS).

Q: User equipment comprising: a communications interface configured to communicate via a first access network; a processor; and one or more components operated by the processor to perform operations comprising: transmitting a registration request via the first access network to a core network device; receiving a reply via the communications interface, the reply comprising a status indication; in response to the status indication having a predetermined first value, retrying the registration request via the first access network; and in response to the status indication having a predetermined second value different from the predetermined first value, commencing a delay to extend over a predetermined time period, and refraining, during the delay, from retrying the registration request via the first access network.

R: The user equipment according to paragraph Q, wherein the operations further comprise, subsequent to the predetermined time period, retrying the registration request via the first access network.

S: The user equipment according to paragraph Q or R, wherein the operations further comprise, subsequent to retrying the registration request via the first access network: determining that the retrying the registration request has failed; and in response, refraining from retrying via the first access network as long as a retry condition has not been detected.

T: The user equipment according to any of paragraphs Q-S, further comprising a user interface, wherein the operations further comprise, in response to the status indication having the predetermined second value: receiving location information via the user interface; and retrying the registration request via the first access network, the retried registration request determined based at least in part on the location information.

U: The user equipment according to any of paragraphs Q-T, further comprising a user interface, wherein the operations further comprise, in response to the status indication having the predetermined second value, presenting, via the user interface, a message associated with the predetermined second value.

V: The user equipment according to any of paragraphs Q-U, wherein the operations further comprise: determining that at least one of the following has occurred: a connection state associated with the first access network has changed; a second access network is available; a user command to restart communication via the first access network has been received; or a user command to restart registration-based service via the first access network has been received; and in response to the determination: canceling the delay; and retrying the registration request.

W: The user equipment according to any of paragraphs Q-V, wherein the first access network is a location-agnostic wireless network.

X: The user equipment according to paragraph W, wherein the first access network is a wireless network.

Y: The user equipment according to any of paragraphs Q-X, the operations further comprising, after retrying the registration request via the first access network, performing the following operations in order: determining that the retrying the registration request via the first access network has failed; delaying for a second predetermined time period; retrying the registration request again via the first access network; determining that the retrying the registration request again via the first access network has failed; and refraining from retrying via the first access network as long as a retry condition has not been detected.

Z: The user equipment according to any of paragraphs Q-Y, wherein the predetermined time period is longer than five minutes.

AA: A method comprising, by a core network device of a telecommunications network, performing the following operations in order: receiving a request associated with a user equipment (UE); transmitting a third-party request on behalf of the UE via the telecommunications network to a mandatory network device; receiving a first reply from the mandatory network device via the telecommunications network, the first reply indicating success or failure of the third-party request; determining a second reply based at least in part on the first reply; and transmitting the second reply to the UE via the telecommunications network.

AB: The method according to paragraph AA, further comprising, in response to the first reply indicating failure of the third-party request, determining the second reply indicating failure of the request.

AC: The method according to paragraph AA or AB, further comprising, after receiving the request and before receiving the first reply, transmitting a second third-party request on behalf of the UE via the telecommunications network to a discretionary network device.

AD: The method according to paragraph AC, further comprising: receiving a third reply from the discretionary network device via the telecommunications network, the third reply indicating success or failure of the second third-party request; and in response to the first reply indicating failure of the third-party request and the third reply indicating success of the second third-party request, determining the second reply indicating the failure of the third-party request and the success of the second third-party request.

AE: The method according to any of paragraphs AA-AD, further comprising, in response to the first reply indicating that the third-party request was successful, transmitting a second third-party request on behalf of the UE via the telecommunications network to an additional network device.

AF: The method according to paragraph AE, further comprising: receiving a third reply from the additional network device via the telecommunications network, the third reply indicating success or failure of the second third-party request; determining the second reply indicating the same success or failure of the request as the third reply indicates of the second third-party request; and in response to the third reply indicating failure of the second third-party request, transmitting a removal request associated with the UE to the mandatory network device.

AG: The method according to any of paragraphs AA-AF, wherein the request and the third-party request comprise respective Session Initiation Protocol (SIP) REGISTER requests and the first reply and the second reply comprise respective SIP responses.

AH: User equipment comprising: a communications interface configured to communicate via a first access network; a processor; and one or more components operated by the processor to perform operations comprising: transmitting a registration request via the first access network to a core network device; receiving a reply via the communications interface, the reply comprising a status indication; in response to the status indication having a predetermined first value, retrying the registration request via the first access network; and in response to the status indication having a predetermined second value different from the predetermined first value, commencing a delay to extend over a predetermined time period, and refraining, during the delay, from retrying the registration request via the first access network.

AI: The user equipment according to paragraph AH, wherein the operations further comprise, subsequent to the predetermined time period, retrying the registration request via the first access network.

AJ: The user equipment according to paragraph AH or AI, wherein the operations further comprise, subsequent to retrying the registration request via the first access network: determining that the retrying the registration request has failed; and in response, refraining from retrying via the first access network as long as a retry condition has not been detected.

AK: The user equipment according to any of paragraphs AH-AJ, further comprising a user interface, wherein the operations further comprise, in response to the status indication having the predetermined second value: receiving location information via the user interface; and retrying the registration request via the first access network, the retried registration request determined based at least in part on the location information.

AL: The user equipment according to any of paragraphs AH-AK, further comprising a user interface, wherein the operations further comprise, in response to the status indication having the predetermined second value, presenting, via the user interface, a message associated with the predetermined second value.

AM: The user equipment according to any of paragraphs AH-AL, wherein the operations further comprise: determining that at least one of the following has occurred: a connection state associated with the first access network has changed; a second access network is available; a user command to restart communication via the first access network has been received; or a user command to restart registration-based service via the first access network has been received; and in response to the determination: canceling the delay; and retrying the registration request.

AN: The user equipment according to any of paragraphs AH-AM, wherein the first access network is a location-agnostic wireless network.

AO: The user equipment according to paragraph AN, wherein the first access network is a wireless network.

AP: The user equipment according to any of paragraphs AH-AO, the operations further comprising, after retrying the registration request via the first access network, performing the following operations in order: determining that the retrying the registration request via the first access network has failed; delaying for a second predetermined time period; retrying the registration request again via the first access network; determining that the retrying the registration request again via the first access network has failed; and refraining from retrying via the first access network as long as a retry condition has not been detected.

AQ: The user equipment according to any of paragraphs AH-AP, wherein the predetermined time period is longer than five minutes.

AR: A computer-readable medium, e.g., a computer storage medium, having thereon computer-executable instructions, the computer-executable instructions upon execution configuring a computer to perform operations as any of paragraphs A-P or AA-AG recites.

AS: A device comprising: a processor; and a computer-readable medium, e.g., a computer storage medium, having thereon computer-executable instructions, the computer-executable instructions upon execution by the processor configuring the device to perform operations as any of paragraphs A-P or AA-AG recites.

AT: A system comprising: means for processing; and means for storing having thereon computer-executable instructions, the computer-executable instructions including means to configure the system to carry out a method as any of paragraphs A-P or AA-AG recites.

AU: A computer-readable medium, e.g., a computer storage medium, having thereon components as any of paragraphs Q-Z or AH-AQ recites.

CONCLUSION

Example data transmissions (parallelograms) in FIGS. 1 and 2, example data exchanges in the call flow diagrams of FIGS. 3 and 4, and example blocks in the process diagrams of FIGS. 5-10 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the operations or transmissions are described is not intended to be construed as a limitation, and any number of the described operations or transmissions can be executed or performed in any order, combined in any order, subdivided into multiple sub-operations or transmissions, and/or executed or transmitted in parallel to implement the described processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Some examples herein are described in the context of a VoLTE network with SIP signaling for clarity of explanation. However, other networks and signaling systems employing operations described herein are encompassed within this disclosure. For example, techniques herein can be used with publish/subscribe protocols such as ZEROMQ running over IP networks. Similarly, this disclosure refers to similar operations being performed by protocols evolved from IP, SIP, and VoLTE. Moreover, techniques described herein can be used in staged setup protocols or processes in which the first request is not a registration request. For example, techniques herein can be used in a staged setup process in which the first request is a capability-query request, e.g., to determine which protocol versions or encryption techniques a network peer supports.

Some examples herein are described in the context of registration requests for clarity of explanation. However, other types of requests can be processed as described herein. For example, described example techniques (e.g., shown in any of FIG. 1, 2, or 4-10) for the handling of registration requests and responses by core network devices or computing devices (e.g., terminals) can additionally or alternatively be used for handling of requests other than registration requests, such as subscription requests, connection requests, syndication-publishing requests, or other types of requests.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" and the phrase "and/or" are used herein in an inclusive sense unless specifically stated otherwise. Accordingly, conjunctive language such as the phrases "X, Y, or Z," "X, Y, and/or Z," and/or "at least one of X, Y or Z," unless specifically stated otherwise, is to be understood as signifying that an item, term, etc., can be either X, Y, or Z, or a combination thereof. Conditional language such as, among others, "can," "could," "might," or "may," unless specifically stated otherwise, are understood within the context to present that certain examples include, while other examples do not include, certain features, elements, operations, or steps. Thus, such conditional language is not generally intended to imply that certain features, elements, operations, or steps are in any way required for one or more examples or that one or more examples necessarily include logic for deciding, with or without user input or prompting, whether certain features, elements, operations, or steps are included or are to be performed in any particular example.

Furthermore, although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

What is claimed is:

1. A method comprising, by a core network device of a telecommunications network, performing the following operations in order:
    receiving a first registration request from a user equipment (UE) at the core network device;
    determining that the first registration request successfully registered the UE with the core network device;
    transmitting a third-party registration request on behalf of the UE via the telecommunications network from the core network device to a mandatory network device prior to sending any reply to the UE to prevent the UE from sending additional requests to the core network device;
    receiving a first reply from the mandatory network device at the core network device via the telecommunications network, the first reply indicating success or failure of the third-party registration request;
    determining a second reply to the UE based at least in part on the first reply, the second reply comprising either:
        transmitting a failure-reply to the UE via the telecommunications network when the third-party registration request fails; or
        transmitting a success-reply when the third-party registration request succeeds.

2. The method according to claim 1, further comprising, in response to the first reply indicating failure of the third-party registration request, determining the second reply indicating failure of the third-party registration request, the second reply comprising either:
    a first-failure reply when a second third-party registration request is likely to be successful; or
    a second failure-reply message when a second third-party registration request is likely to be unsuccessful, the second failure-reply message to prevent the UE from sending a second registration request at least for a predetermined amount of time.

3. The method according to claim 1, further comprising, after receiving the first registration request and before receiving the first reply, transmitting a second third-party registration request on behalf of the UE via the telecommunications network to a discretionary network device.

4. The method according to claim 3, further comprising:
    receiving a third reply from the discretionary network device via the telecommunications network, the third reply indicating success or failure of the second third-party registration request; and
    in response to the first reply indicating failure of the third-party registration request and the third reply indicating success of the second third-party registration request, determining the second reply indicating the failure of the third-party registration request and the success of the second third-party registration request.

5. The method according to claim 1, further comprising, in response to the first reply indicating that the third-party registration request was successful, transmitting a second third-party registration request on behalf of the UE via the telecommunications network to an additional network device.

6. The method according to claim 5, further comprising:
    receiving a third reply from the additional network device via the telecommunications network, the third reply indicating success or failure of the second third-party registration request;
    determining the second reply indicating the same success or failure of the registration request as the third reply indicates of the second third-party registration request; and
    in response to the third reply indicating failure of the second third-party registration request, transmitting a deregistration request to the mandatory network device on behalf of the UE.

7. The method according to claim 1, wherein the first registration request and the third-party registration request comprise respective Session Initiation Protocol (SIP) REG- ISTER requests and the first reply and the second reply comprise respective SIP responses.

8. A method comprising, by a core network device of a telecommunications network, performing the following operations in order:
    receiving a first registration request from a user equipment (UE) at the core network device;
    processing the first request to determine a success or failure of the first registration request with the core network device; and
        in response to failure of the first registration request, transmitting either:
            a first failure-reply message to the UE via the telecommunications network when a second registration request is likely to be successful; or
            a second failure-reply message to the UE via the telecommunications network when a second registration request is likely to be unsuccessful, the second failure-reply message to prevent the UE from sending a second registration request at least for a predetermined amount of time; or
        in response to success of the first registration request:
            determining a second registration request based at least in part on the first registration request; and
            transmitting the second registration request on behalf of the UE via the telecommunications network from the core network device to a mandatory network device.

9. The method according to claim 8, further comprising, in response to the success of the processing:
    receiving a first reply from the mandatory network device, the first reply indicating success or failure of the second registration request;
    determining a second reply based at least in part on the first reply; and
    transmitting the second reply to the UE via the telecommunications network.

10. The method according to claim 9, wherein the second failure-reply message is associated with a first error code, the method further comprising, in response to the first reply indicating failure of the second registration request, determining the second reply including a second error code different from the first error code.

11. The method according to claim 10, wherein the first failure-reply message, the second failure-reply message, and the second reply are respective Session Initiation Protocol (SIP) responses, the first error code is a SIP 4xx response code, and the second error code is a SIP 5xx error code.

12. The method according to claim 8, further comprising, after transmitting the second request:
    awaiting, for a predetermined timeout period, a first reply from the mandatory network device;
    in response to expiration of the timeout period without receiving the first reply, determining a second reply indicating failure of the processing; and
    transmitting the second reply to the UE via the telecommunications network.

13. The method according to claim 8, wherein the processing the first registration request comprises:
    acquiring validation information associated with the UE from an information server; and
    in response to the validation information indicating the UE is authorized to submit the first registration request, determining that the processing has succeeded.

14. The method according to claim 8, wherein the first registration request comprises a Session Initiation Protocol (SIP) REGISTER request and the second registration request comprises a SIP third-party registration request.

15. The method according to claim 8, wherein the core network device comprises a serving call session control function (S-CSCF) and the mandatory network device comprises a Telephony Application Server (TAS).

16. User equipment comprising:
    a communications interface configured to communicate via a first access network;
    a processor; and
    one or more components operated by the processor to perform operations comprising:
        transmitting a first registration request via the first access network to a core network device;
        refraining from retrying a second registration request until a reply is received from the core network device;
        receiving the reply via the communications interface, the reply comprising a status indication of the first registration request, and either:
            in response to the status indication having a first value, sending the second registration request via the first access network; or
            in response to the status indication having a second value different from the first value, commencing a delay to extend over a predetermined time period, and refraining, during the delay, from retrying the second registration request via the first access network;
    wherein the first value indicates that sending the second registration request will likely be successful; and
    wherein the second value indicates that sending the second registration request will likely be unsuccessful during the predetermined time period.

17. The user equipment according to claim 16, wherein the operations further comprise, subsequent to the predetermined time period, sending a second registration request via the first access network.

18. The user equipment according to claim 16, further comprising a user interface, wherein the operations further comprise, in response to the status indication having the second value:
    receiving location information via the user interface; and
    sending a second registration request via the first access network, the second registration request determined based at least in part on the location information.

19. The user equipment according to claim 16, wherein the operations further comprise:
    determining that at least one of the following has occurred:
        a connection state associated with the first access network has changed;
        a second access network is available;
        a user command to restart communication via the first access network has been received; or
        a user command to restart registration-based service via the first access network has been received; and
    in response to the determination:
        canceling the delay; and
        sending a second registration request.

20. The user equipment according to claim 16, wherein the first access network is a wireless network.

* * * * *